US011313960B2

(12) United States Patent
Yamanouchi

(10) Patent No.: US 11,313,960 B2
(45) Date of Patent: Apr. 26, 2022

(54) APPARATUS, METHOD, AND COMPUTER-READABLE MEDIUM TO GENERATE AN OBJECT IMAGE USING CORRELATION MATRICES

(71) Applicant: NEC Corporation, Tokyo (JP)

(72) Inventor: Shingo Yamanouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 282 days.

(21) Appl. No.: 16/484,515

(22) PCT Filed: Jan. 17, 2018

(86) PCT No.: PCT/JP2018/001253
§ 371 (c)(1),
(2) Date: Aug. 8, 2019

(87) PCT Pub. No.: WO2018/147025
PCT Pub. Date: Aug. 16, 2018

(65) Prior Publication Data
US 2020/0011986 A1    Jan. 9, 2020

(30) Foreign Application Priority Data

Feb. 10, 2017   (JP) .............................. JP2017-023410

(51) Int. Cl.
*G01S 7/35*        (2006.01)
*G01S 13/42*       (2006.01)
(Continued)

(52) U.S. Cl.
CPC ............ *G01S 13/343* (2013.01); *G01S 7/352* (2013.01); *G01S 13/42* (2013.01); *G01S 13/89* (2013.01)

(58) Field of Classification Search
CPC ........ G01S 13/343; G01S 7/352; G01S 13/42; G01S 13/89
See application file for complete search history.

(56) References Cited

U.S. PATENT DOCUMENTS 3,798,552 A * 3/1974 Pratt ......................... G01S 7/28
455/258
8,456,351 B2   6/2013 Kam et al.
(Continued)

FOREIGN PATENT DOCUMENTS

JP        4-313091 A     11/1992
JP     2007-285912 A     11/2007
(Continued)

OTHER PUBLICATIONS

International Search Report in International Application No. PCT/JP2018/001253, dated Feb. 13, 2018.
(Continued)

*Primary Examiner* — Donald H B Braswell
(74) *Attorney, Agent, or Firm* — Sughrue Mion, PLLC

(57) ABSTRACT

An object detection apparatus 1000 includes a plurality of transmitting units 1101 configured to emit a transmission signal, a receiving unit 1102 configured to mix the reception signal with a transmission signal to generate an IF signal, a spectrum calculation unit 1103 configured to calculate a spectrum that indicates a distribution of positions of the object, a section determination unit 1104 configured to determine sections for which a reflectance of the object is to be calculated, a reflectance distribution calculation unit 1105 configured to calculate, for each pair of a transmitting unit and the receiving unit, a reflectance of the object for each section, and calculate a product of the reflectance distributions over the sections, the reflectance distributions being calculated for the respective pairs, and an image generation unit 1106 configured to generate an image using a product of the reflectance distributions calculated for the respective pairs.

11 Claims, 26 Drawing Sheets

(51) Int. Cl.
  *G01S 13/89* (2006.01)
  *G01S 13/34* (2006.01)

(56) References Cited

U.S. PATENT DOCUMENTS

| | | | |
|---|---|---|---|
| 9,599,705 B2 | 3/2017 | Wu et al. | |
| 10,042,046 B2 | 8/2018 | Liu et al. | |
| 10,422,852 B1* | 9/2019 | Thiagarajan | G01S 5/0257 |
| 2011/0043403 A1 | 2/2011 | Löffler | |
| 2013/0030769 A1* | 1/2013 | Asanuma | G01S 13/343 |
| | | | 702/189 |
| 2014/0147181 A1 | 5/2014 | Sugiura et al. | |
| 2014/0247181 A1 | 9/2014 | Nogueira-Nine | |
| 2017/0074980 A1* | 3/2017 | Adib | G01S 13/72 |
| 2018/0299394 A1* | 10/2018 | Lomnitz | G01N 22/02 |

FOREIGN PATENT DOCUMENTS

| | | |
|---|---|---|
| JP | 4653910 B2 | 3/2011 |
| JP | 2011-513721 A | 4/2011 |
| JP | 5080795 B2 | 11/2012 |
| JP | 2013-528788 A | 7/2013 |
| JP | 2015-14611 A | 1/2015 |
| JP | 2015-36682 A | 2/2015 |
| JP | 2017-3494 A | 1/2017 |
| JP | 2017-21013 A | 1/2017 |

OTHER PUBLICATIONS

Written Opinion in International Application No. PCT/JP2018/001253, dated Feb. 13, 2018.

Nobuyoshi, Kikuma, "Fundamentals of Array Antennas", MWE2010 Digest, 2010, pp. 1-10 (10 pages total).

B. R. Slattery, Ph.D., "Use of Mills cross receiving arrays in radar systems", PROC. IEE, Nov. 1966, vol. 113, No. 11, pp. 1712-1722 (11 pages total).

Japanese Office Action for JP Application No. 2018-566817 dated Aug. 10, 2021 with English translation.

* cited by examiner

ARRANGEMENT
(DIAGRAM WHEN VIEWED IN Z-AXIS DIRECTION)

APPARATUS, METHOD, AND COMPUTER-READABLE MEDIUM TO GENERATE AN OBJECT IMAGE USING CORRELATION MATRICES

TECHNICAL FIELD

This application is a National Stage Entry of PCT/JP2018/001253 filed on Jan. 17, 2018, which claims priority from Japanese Patent Application 2017-023410 filed on Feb. 10, 2017, the contents of all of which are incorporated herein by reference, in their entirety.

BACKGROUND ART

In contrast to light, radio waves (such as microwaves, millimeter waves, and terahertz waves) are superior in terms of ability to penetrate through objects. Imaging apparatuses (object detection apparatuses) that use this penetrating ability of radio waves to image items behind clothes, items in bags, or the like, and perform inspection have been put to practical use. Also, remote sensing technology that employs the same idea to image a surface of the earth from a satellite or aircraft through clouds has been put to practical use.

Furthermore, some methods have been proposed as the imaging method of object detection apparatuses. One of the methods is the array antenna method (see Non-Patent Document 1, for example). Hereinafter, the array antenna method will be described with reference to FIGS. 21 to 25. FIG. 21 is a diagram showing an object detection apparatus using the conventional array antenna method. FIG. 22 is a diagram showing a configuration of a receiver shown in FIG. 21.

As shown in FIG. 21, in the array antenna method, the object detection apparatus is provided with a transmitter 211 and a receiver 201. Furthermore, the transmitter 211 is provided with a transmitting antenna 212. The receiver 201 is provided with receiving antennas $202_1, 202_2, \ldots, 202_N$ (where N is the number of receiving antennas).

The transmitter 211 emits, from the transmitting antenna 212, RF signals (radio waves) 213 to detection target objects $204_1, 204_2, \ldots, 204_K$ (where K is the number of target objects). The RF signals (radio waves) 213 are reflected off the detection target objects $204_1, 204_2, \ldots, 204_K$, and reflected waves $203_1, 203_2, \ldots, 203_K$ are respectively generated.

The generated reflected waves $203_1, 203_2, \ldots, 203_K$ are received by the receiving antennas $202_1, 202_2, \ldots, 202_N$. The receiver 201 calculates, based on the received reflected waves $203_1, 203_2, \ldots, 203_K$, the radio wave strengths of the radio waves reflected off the detection target objects $204_1, 204_2, \ldots, 204_K$. Then, the receiver 201 images distributions of the calculated radio wave strengths. Accordingly, respective images of the detection target objects $204_1, 204_2, \ldots, 204_K$ are obtained.

Furthermore, as shown in FIG. 22, when the array antenna method is used, the receiver 201 is provided with N receiving antennas $202_1, 202_2, \ldots, 202_N$. The receiving antennas $202_1, 202_2, \ldots, 202_N$ respectively receive K incoming waves $208_1, 208_2, \ldots, 208_K$ of an angle $\theta_k$ (k=1, 2, ... K).

Here, it is assumed that the incoming waves $208_1, 208_2, \ldots, 208_K$ respectively have complex amplitudes of $[s(\theta_1), s(\theta_2), \ldots, s(\theta_K)]$. Because the receiver 201 is provided with a down-converter (not shown in FIG. 22), complex amplitudes (baseband signals) $[r_1, r_2, \ldots, r_N]$ of the RF signals received by the receiving antennas $202_1, 202_2, \ldots, 202_N$ are extracted by this down-converter. Furthermore, the complex amplitudes $[r_1, r_2, \ldots, r_N]$ of the signals received by the antennas $202_1, 202_2, \ldots, 202_N$ are output to a signal processing unit 205.

The relationship between the complex amplitudes $[r_1, r_2, \ldots, r_N]$ of the reception signals received by the receiving antennas $202_1, 202_2, \ldots, 202_N$, and the complex amplitudes $[s(\theta_1), s(\theta_2), \ldots, s(\theta_K)]$ of the incoming waves reaching the receiving antennas $202_1, 202_2, \ldots, 202_N$ is given by Formula (1) below.

[Formula (1)]

$$\left. \begin{array}{ll} r = As + n(t), & \\ r \equiv [r_1, r_2, \ldots, r_N]^T, & (N \times \text{one-dimensional vector}) \\ s \equiv [s(\theta_1), s(\theta_2), \ldots, s(\theta_K)]^T & (K \times \text{one-dimensional vector}) \\ A \equiv (a(\theta_1), a(\theta_2), \ldots, a(\theta_K)), & (N \times K\text{-dimensional matrix}) \\ a(\theta) \equiv [\exp(j\varphi_1(\theta)), \exp(j\varphi_2(\theta)), \ldots, \exp(j\varphi_N(\theta))]^T, & (N \times \text{one-dimensional vector}) \\ \varphi_n(\theta) \equiv -2\pi \cdot n \cdot d \cdot \sin\theta/\lambda, & (n = 1, 2, \ldots, N) \end{array} \right\} \quad (1)$$

In Formula (1) above, n(t) is a vector whose element is noise content. An additional character T denotes a transpose of a vector or a matrix. d is a distance between antennas, and λ is a wavelength of the incoming waves (RF signals) $208_1, 208_2, \ldots, 208_K$.

Furthermore, in Formula (1) above, a complex amplitude r of a reception signal is an amount obtained through a measurement. A direction matrix A is an amount that can be defined (designated) in signal processing. A complex amplitude s of an incoming wave is unknown, and estimation of the incoming wave direction aims to determine the direction of an incoming wave s based on a reception signal r obtained through a measurement.

In a direction-of-arrival estimation algorithm, a correlation matrix $R=E[r \cdot r^H]$ is calculated based on the reception signal r obtained through a measurement. Here, E[ ] denotes that an element in the parenthesis is subjected to temporal averaging processing, and the additional character H denotes a complex conjugate transpose. Then, based on the calculated correlation matrix R, any of the evaluation functions shown in Formulae (2) to (4) below is calculated.

[Formula 2]

$$P_{BF}(\theta) = \frac{a^H(\theta) R a(\theta)}{a^H(\theta) a(\theta)}, \quad (2)$$

(Evaluation function of beam former method)

-continued

[Formula 3]

$$P_{CP}(\theta) = \frac{1}{a^H(\theta)R^{-1}a(\theta)}, \quad (3)$$

(Evaluation function of Capton method)

[Formula 4]

$$P_{MU}(\theta) = \frac{a^H(\theta)a(\theta)}{a^H(\theta)E_N E_N^H a(\theta)}, \quad (4)$$

$$E_N = [e_{K+1}, \ldots, e_N],$$

(Evaluation function of MUSIC method)

In the MUSIC method, $E_N=[e_{K+1}, \ldots, e_N]$ is a matrix that is configured by N−(K+1) vectors whose characteristic numbers indicate electric power of a noise n(t), out of characteristic vectors of the correlation matrix R.

Furthermore, in the conventional antenna array shown in FIG. 22, the procedure for calculating the correlation matrix R based on the reception signals r, as well as the procedure for calculating the evaluation function of any of Formulae (2) to (4) are executed by the signal processing unit 205.

According to the theory described in Non-Patent Document 1, the evaluation functions shown in Formulae (2) to (4) have peaks at angles $\theta_1, \theta_2, \ldots, \theta_K$ of the incoming waves. Accordingly, if an evaluation function is calculated and its peak is referenced, the angle of the corresponding incoming wave can be obtained. Based on a distribution of the angles of the incoming waves that are obtained using the evaluation functions shown in Formulae (2) to (4), the positions and the shape of target objects can be displayed as images.

Furthermore, a signal processing unit that is used when, out of the evaluation functions shown in Formulae (2) to (4), especially the evaluation function of Formula (2) of the beam former method is applied is shown in FIG. 23. FIG. 23 is a diagram showing an example of a case where the beam former method is applied to the receiver shown in FIG. 21.

Phase shifters $206_1, 206_2, \ldots, 206_N$ and a compositor 207 of a conventional antenna array that are shown in FIG. 23 correspond to the signal processing unit 205 of the conventional antenna array shown in FIG. 22. The phase shifters $206_1, 206_2, \ldots, 206_N$ respectively add phase rotations $\Phi_1, \Phi_2, \ldots, \Phi_N$ to the complex amplitudes of the incoming waves $208_1, 208_2, \ldots, 208_N$ received by the receiving antennas $202_1, 202_2, \ldots, 202_N$. The incoming waves $208_1, 208_2, \ldots, 208_N$ to which the phase rotations $\Phi_1, \Phi_2, \ldots, \Phi_N$ are added are summed by the adder 207.

The phase shifters $206_1, 206_2, \ldots, 206_N$ and the adder 207 may be implemented using analog circuits or using software incorporated into a computer. Furthermore, in the array antenna method, the directionality of the array antenna is controlled by the phase shifters $206_1, 206_2, \ldots, 206_N$ setting the phase rotations $\Phi_1, \Phi_2, \ldots, \Phi_N$. Assuming that the directionality of a receiving antenna 202 is g(θ), and the amplitude and phase of an incoming wave $208_n$ (n=1, 2, ..., K) received by a receiving antenna $202_n$ are respectively $a_n$ and $\varphi_n$, the directionality E(θ) of the array antenna is calculated with Formula (5) below.

[Formula 5]

$$E(\theta) = g(\theta)\sum_{n=1}^{N} a_n\exp(j\phi_n)\exp(j\Phi_n) = g(\theta)AF(\theta), \quad (5)$$

In Formula (5), a directional component AF(θ) obtained by removing the directionality g(θ) of the receiving antenna 202 from the directionality E(θ) of the array antenna is referred to as an "array factor". The array factor AF(θ) indicates the directionality effect achieved as a result of forming the array antenna. A signal received by the receiving antenna $202_n$ (n=1, 2, ..., N) is $g(\theta)a_n \exp(j\varphi_n)$. Furthermore, a signal obtained by adding, using the adder 207, the signals $g(\theta)a_n \exp(j\varphi n)\exp(j\Phi_n)$ to which a phase rotation $\Phi_n$ of a phase shifter $206_n$ is added for cases where n=1, 2, ..., N is obtained as the directionality E(θ) of Formula (5).

Assuming that the angle of incident of the incoming waves $208_1, 208_2, \ldots, 208_N$ is θ, the phase $\varphi_n$ of the incoming wave $208_n$ is given as $-2\pi \cdot n \cdot d \cdot \sin \theta/\lambda$ (where n=1, 2, ..., K). Here, d is a distance of receiving antennas $202_n$ (n=1, 2, ..., N), and λ is a wavelength of the incoming waves $208_1, 208_2, \ldots, 208_N$.

If, in Formula (5) above, the amplitude $a_n$ is constant irrespective of n, and the phase rotation $\Phi_n$ (n=1, 2, ..., N) of the phase shifter $206_n$ is set to a value obtained by multiplying the phase $\varphi_n$ of the incoming wave $208_n$ by −1, the array factor AF(θ) is greatest in the direction of the angle θ. This shows, namely, a way to control the directionality of the array antenna using the phase rotation $\Phi_n$ of the phase shifter $206_n$.

In addition, other examples of object detection apparatuses according to the array antenna method are also disclosed in Patent Documents 1 to 3. Specifically, the object detection apparatuses disclosed in Patent Documents 1 and 2 use phase shifters respectively connected to N receiving antennas built in a receiver to control the directionality of a receiving array antenna configured by the N receiving antennas.

Also, the object detection apparatuses disclosed in Patent Documents 1 and 2 change the directionality of the N beam-shaped receiving array antennas, and emit directional beams of the receiving array antennas to D detection target objects. Accordingly, the strengths of radio waves reflected off the respective detection target objects are calculated.

Furthermore, the object detection apparatus disclosed in Patent Document 3 uses the frequency dependence of N receiving array antennas to control the directionality of the N receiving array antennas. Furthermore, similar to the examples of Patent Documents 1 and 2, the object detection apparatus disclosed in Patent Document 3 also emits directional beams of the N receiving array antennas to D detection target objects, and calculates the strengths of radio waves reflected off the respective detection target objects.

Furthermore, an actual object detection apparatus includes, as shown in FIG. 24, N receiving antennas 202 that are arranged in each of vertical and horizontal directions, so as to display a two-dimensional image. In this case, the total number of required antennas is $N^2$. FIG. 24 is a diagram showing a schematic configuration of receiving array antennas when the conventional array antenna method is employed.

Furthermore, the Mills cross method is also known as a method for displaying a two-dimensional image (see, for example, Non-Patent Document 2). FIG. 25 is a diagram showing an object detection apparatus that employs the Mills cross method. As shown in FIG. 25, this object detection apparatus is provided with a one-dimensional array antenna 201 arranged in a vertical direction and a one-dimensional array antenna 201 arranged in a horizontal direction. Also, in this object detection apparatus, a multiplier 221 calculates a product of signals for each pair of a receiving antenna arranged in the vertical direction and a receiving antenna arranged in the horizontal direction. Accordingly, using the calculated products, it is possible to display a two-dimensional image.

Then, as another imaging method of an object detection apparatus, a Synthetic Aperture Radar (SAR) method will be described with reference to FIG. 26. FIG. 26 is a diagram showing an object detection apparatus that employs the conventional synthetic aperture radar method.

As shown in FIG. 26, in the synthetic aperture radar method, the object detection apparatus is provided with a transmitter 311 and a receiver 301. Also, the transmitter 311 is provided with a transmitting antenna 312. The receiver 301 is provided with a receiving antenna 302.

The transmitter 311 emits, from the transmitting antenna 312, RF signals (radio waves) 313 to detection target objects $304_1$, $304_2$, . . . , $304_K$ (where K is the number of detection target objects). The RF signals (radio waves) 313 are reflected off the detection target objects $304_1$, $304_2$, . . . , $304_K$, and reflected waves $303_1$, $303_2$, . . . , $303_K$ are respectively generated.

At this time, while sequentially moving to preset N positions, the receiver 301 receives, at the respective positions, the reflected waves $303_1$, $303_2$, . . . , $303_K$. In FIG. 25, the reference numerals $301_1$, $301_2$, . . . , $301_N$ denote the receiver 301 at the respective positions. Furthermore, the reference numerals $302_1$, $302_2$, . . . , $302_N$ denote the receiving antenna at the respective positions. N is the number of preset positions of the receiver 301.

Accordingly, the single receiving antenna 302 functions as N receiving antennas $302_1$, $302_2$, . . . , $302_N$. In other words, in FIG. 25, one receiving antenna forms a receiving array antenna (virtual array antenna) configured by N antennas, similar to the receiving antennas $202_1$, $202_2$, . . . , $202_N$ of the array antenna method shown in FIG. 21.

Accordingly, also in the synthetic aperture radar method shown in FIG. 26, similar to the array antenna method shown in FIG. 21, the receiver 301 calculates, based on the received reflected waves $303_1$, $303_2$, . . . , $303_K$, the strengths of the radio waves reflected off the detection target objects $304_1$, $304_2$, . . . , $304_K$. Then, the receiver 301 images distributions of the calculated strengths of the radio waves. Accordingly, respective images of the detection target objects $304_1$, $304_2$, . . . , $304_K$ are obtained.

Moreover, Patent Documents 4 to 6 disclose examples of object detection apparatuses according to the synthetic aperture radar method. Patent Document 7 discloses an example of an on-board radar, instead of an imaging apparatus. The on-board radar disclosed in Patent Document 7 measures a distance from the on-board radar to a target object (at a position in a front-back direction with respect to the on-board radar) using Frequency Modulated Continuous Wave (FMCW) signals. This on-board radar also measures the position of the target object through direction-of-arrival estimation using the MUSIC method. Note that, in this case, the position of the target object is expressed by an angle with respect to a reference line that passes through the on-board radar.

LIST OF RELATED ART DOCUMENTS

Patent Documents

Patent Document 1: Japanese Translation of PCT International Application Publication No. 2013-528788
Patent Document 2: Japanese Patent Laid-Open Publication No. 2015-014611
Patent Document 3: Japanese Patent No. 5080795
Patent Document 4: Japanese Patent No. 4653910
Patent Document 5: Japanese Translation of PCT International Application Publication No. 2011-513721
Patent Document 6: Japanese Patent Laid-Open Publication No. 2015-036682
Patent Document 7: Japanese Patent Laid-Open Publication No. 2007-285912

Non Patent Documents

Non-Patent Document 1: Nobuyoshi, KIKUMA, "Fundamentals of Array Antennas", MWE2010 Digest, (2010)
Non-Patent Document 2: B. R. Slattery, "Use of Mills cross receiving arrays in radar systems", PROC. IEE, Vol. 113, No. 11, NOVEMBER 1966, pp. 1712-1722.

SUMMARY OF INVENTION

Problems to be Solved by the Invention

Meanwhile, in the array antenna method, if attempts are made to accurately detect a target object, the number of required receiving antennas and the number of associated receivers will significantly increase, resulting in the problem that the cost, size, and weight of an object detection apparatus will increase.

The above-described problem will be specifically described. First, in a case of the array antenna method, an inter-antenna distance between receiving antennas $202_1$, $202_2$, . . . , $202_N$ needs to be set to half or less of the wavelength A of the reflected waves $203_1$, $203_2$, . . . , $203_K$ that are received by the receiver 201. For example, if the reflected waves $203_1$, $203_2$, . . . , $203_K$ are millimeter waves, the wavelength A is about several millimeters, and thus the inter-antenna distance is not greater than several millimeters. Also, if this condition is not satisfied, a problem occurs in that, in a generated image, a virtual image appears at a position at which none of the detection target objects $204_1$, $204_2$, . . . , $204_K$ are present.

Furthermore, the resolution of the image depends on a directional beam width Δθ of the receiving array antennas ($202_1$, $202_2$, . . . , $202_N$). The directional beam width Δθ of the receiving array antennas ($202_1$, $202_2$, . . . , $202_N$) is given as Δθ~λ/D. Here, D is an aperture size of the receiving array antennas ($202_1$, $202_2$, . . . , $202_N$), and corresponds to the distance between the receiving antennas $202_1$ and $202_N$ provided at both ends. In other words, in order to achieve a resolution that can be practically used in imaging of items behind clothes, items in bags, or the like, the aperture size D of the receiving array antennas ($202_1$, $202_2$, . . . , $202_N$) needs to be set to a value from several tens of centimeters to about several meters.

In view of the above-described two conditions, namely, the condition that the inter-antenna distance between N receiving antennas is set to half or less of the wavelength λ (several millimeters or less), and the condition that the distance between the receiving antennas provided at both ends needs to be about at least several tens of centimeters, the number N of antennas required for each column is about several hundred.

Furthermore, an actual object detection apparatus includes, as shown in FIG. 24, N receiving antennas 202 arranged in each of the vertical and horizontal directions, in order to display a two-dimensional image. In this case, the total number of required receiving antennas is $N^2$. Accordingly, in order to employ the array antenna method, the total number of required receiving antennas and associated receivers is about several tens of thousands.

Since a large number of receiving antennas and receivers are required in this way, the array antenna method is significantly expensive in terms of cost as described above. Furthermore, the antennas are arranged in a square region with each side being several tens of centimeters to several meters, and thus the apparatus is significantly large and heavy.

Furthermore, according to the above-described object detection apparatus of the Mills cross method shown in FIG. 25, the number of receiving antennas and receivers can be reduced, compared to a case where the array antenna method is employed. However, even in this case, the number of required receiving antennas and receivers is 2N, and about several hundred receiving antennas are required in the end. Accordingly, even in this case, it is difficult to solve the problem in the cost, device size, and device weight.

Furthermore, in the above-described object detection apparatus that employs the synthetic aperture radar method shown in FIG. 26, the receiver needs to be mechanically moved, and thus there is the problem that it is difficult to reduce the scanning time. Also, this problem leads to the problem that, when inspecting items or people, the object detection apparatus can inspect a limited number of target objects per unit of time. Furthermore, the object detection apparatus disclosed in Patent Document 6 requires a mechanical mechanism for moving the receiver, and thus there is the problem that the size and weight of the device is increased.

On the other hand, on-board radars, which encompass the on-board radar disclosed in Patent Document 7, are typically downsized relative to the imaging apparatuses disclosed in Patent Documents 1 to 3. However, due to being downsized, the resolution of the on-board radars is reduced relative to that of the imaging device. Due to the reduced resolution, the on-board radar cannot identify the shape of a target object but can only recognize the position of the target object.

Specifically, when the FMCW method disclosed in Patent Document 7 is employed, the resolution can be given as c/(2 BW), where c is the speed of light, and BW is a bandwidth of an RF signal. Accordingly, if the bandwidth BW is set to 2 GHz, the resolution is calculated as 7.5 cm. With this resolution, although the position of a target object that is several centimeters in size can be measured, the shape of the target object that is several centimeters in size is hard to identify.

In addition, in the on-board radar disclosed in Patent Document 7, the aperture size D is reduced to about several centimeters. Accordingly, there is also the problem that the directional beam width $\Delta\theta \sim \lambda/D$ increases, and the resolution of measurement in an angle direction (direction-of-arrival estimation) is reduced.

As described above, in the conventional object detection apparatus, if a desired resolution of a millimeter wave image is to be achieved, the cost, size, and weight of the device will be significantly increased. On the other hand, if an attempt is made to downsize the device, there is the problem that the resolution of a millimeter wave image will be reduced.

Therefore, the usages and chances in which an object detection apparatus can be actually used are restricted. Furthermore, depending on the employed method, the speed of inspection of a target object is also restricted. In view of the aforementioned circumstances, there is a demand for reducing the number of required antennas and receivers compared to those in a conventional case, and realizing image generation with high-speed scanning without the need to move a receiver.

An example object of the invention is to provide an object detection apparatus, an object detection method, and a computer-readable recording medium that can solve the aforementioned problems, and can improve the accuracy of detecting an object using radio waves, while suppressing increases in the device cost, size and weight.

Means for Solving the Problems

In order to achieve the aforementioned object, an object detection apparatus for detecting an object using radio waves according to an example aspect of the invention includes:

a plurality of transmitting units configured to emit, to the object, radio waves that serve as transmission signals;

a receiving unit that is associated with any one of the plurality of transmitting units, and is configured to receive the radio waves reflected off the object as reception signals, and further mix the transmission signals with the received reception signals to generate intermediate frequency signals;

a spectrum calculation unit configured to calculate, based on the intermediate frequency signals, a spectrum that indicates a distribution of positions of the object;

a section determination unit configured to determine, based on peak positions of an amplitude of the calculated spectrum, sections for which a reflectance of the object is to be calculated;

a reflectance distribution calculation unit configured to calculate, for each pair of a transmitting unit and the receiving unit associated therewith, a reflectance of the object in each of the determined sections based on the intermediate frequency signals, and further calculate a product of the reflectance distributions over the sections, the reflectance distributions being calculated for the respective pairs; and an image generation unit configured to generate an image using the product of the reflectance distributions calculated for the respective pairs.

Furthermore, in order to achieve the aforementioned object, a object detection method for detecting an object, according to an example aspect of the invention, using an apparatus that includes a plurality of transmitting units configured to emit, to the object, radio waves that serve as transmission signals, and a receiving unit that is associated with any one of the plurality of transmitting units, and is configured to receive the radio waves reflected off the object as reception signals, and further mix the transmission signals with the received reception signals to generate intermediate frequency signals, includes:

(a) a step of calculating, based on the intermediate frequency signals, a spectrum that indicates a distribution of positions of the object;

(b) a step of determining, based on peak positions of an amplitude of the calculated spectrum, sections for which a reflectance of the object is to be calculated;

(c) a step of calculating, for each pair of a transmitting unit and the receiving unit associated therewith, a reflectance of the object in each of the determined sections based on the intermediate frequency signals, and further calculating a product of the reflectance distributions over the sections, the reflectance distributions being calculated for the respective pairs; and (d) a step of generating an image using the product of the reflectance distributions calculated for the respective pairs.

Furthermore, in order to achieve the aforementioned object, a non-transitory computer readable recording medium according to an example aspect of the invention is for use in an object detection apparatus that includes a plurality of transmitting units configured to emit, to an object, radio waves that serve as transmission signals, a receiving unit that is associated with any one of the plurality of transmitting units, and is configured to receive the radio waves reflected off the object as reception signals, and further mix the transmission signals with the received reception signals to generate intermediate frequency signals, and a processor, the non-transitory computer readable recording medium including a program recorded thereon, the program including instructions that cause the processor to carry out:

(a) a step of calculating, based on the intermediate frequency signals, a spectrum that indicates a distribution of positions of the object;

(b) a step of determining, based on peak positions of an amplitude of the calculated spectrum, sections for which a reflectance of the object is to be calculated;

(c) a step of calculating, for each pair of a transmitting unit and the receiving unit associated therewith, a reflectance of the object in each of the determined sections based on the intermediate frequency signals, and further calculating a product of the reflectance distributions over the sections, the reflectance distributions being calculated for the respective pairs; and (d) a step of generating an image using the product of the reflectance distributions calculated for the respective pairs.

Advantageous Effects of the Invention

As described above, according to the invention, it is possible to improve the accuracy of detecting an object using radio waves, while suppressing increases in the device cost, size, and weight.

EXAMPLE EMBODIMENT

Example Embodiment

Hereinafter, an object detection apparatus, an object detection method, and a program according to an example embodiment of the invention will be described with reference to FIGS. 1 to 20.

[Apparatus Configuration]

Figure 1:
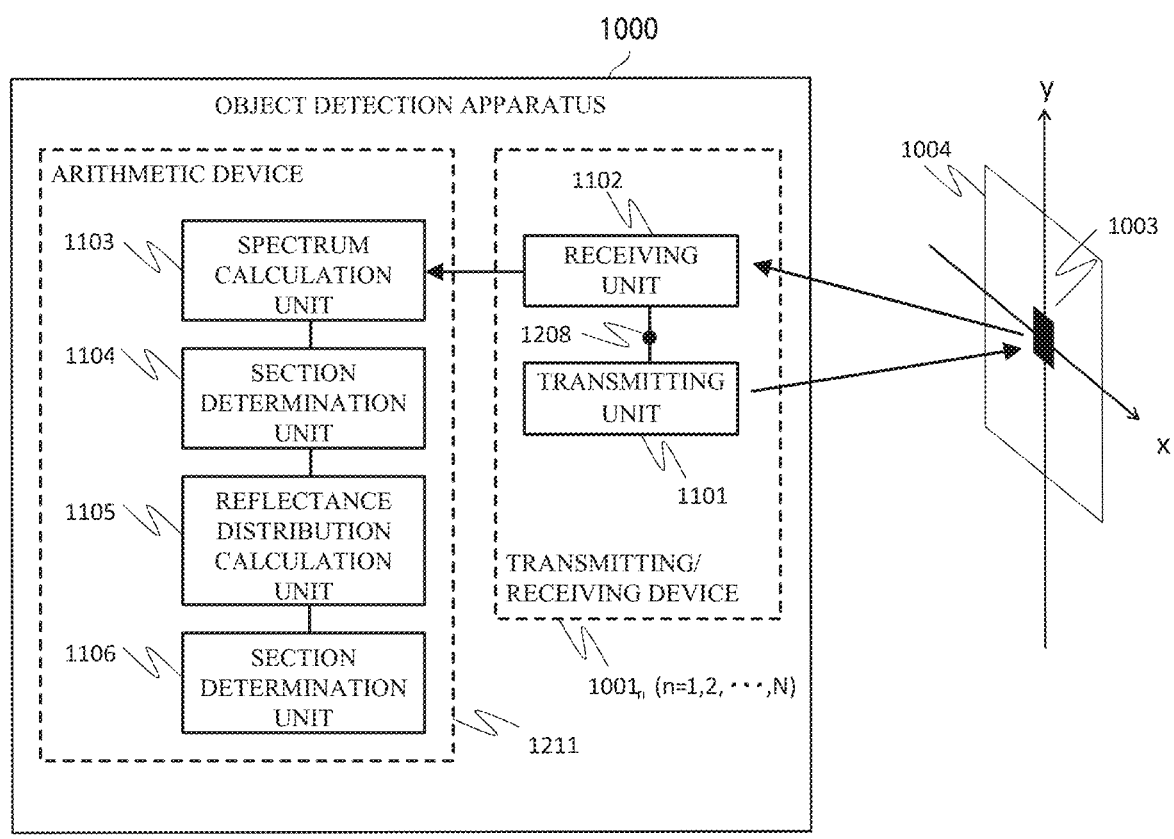
FIG. 1 is a block diagram illustrating a configuration of an object detection apparatus according to an example embodiment of the invention.

First, a configuration of the object detection apparatus according to the present example embodiment will be described with reference to FIG. 1. FIG. 1 is a block diagram illustrating a configuration of the object detection apparatus according to the example embodiment of the invention.

An object detection apparatus 1000 according to the example embodiment shown in FIG. 1 is an apparatus for detecting a target object 1003 using radio waves. As shown in FIG. 1, the object detection apparatus 1000 is provided with a transmitting unit 1101, a receiving unit 1102, a spectrum calculation unit 1103, a section determination unit 1104, a reflectance distribution calculation unit 1105, and an image generation unit 1106.

The transmitting unit 1101 emits, to the object 1003, radio waves that serve as transmission signals. The receiving unit 1102 receives the radio waves reflected off the object 1003 as reception signals, and mixes the transmission signals generated by the transmitting unit 1101 with the received reception signals to generate intermediate frequency signals (hereinafter, referred to as "Intermediate Frequency (IF) signals"). Also, in FIG. 1, only one transmitting unit 1101 and only one receiving unit 1102 are shown, but a plurality of transmitting units 1101 and a plurality of receiving units 1102 are actually provided. Also, one receiving unit 1102 corresponds to any one of the transmitting units 1101.

The spectrum calculation unit 1103 calculates a spectrum that indicates a distribution of positions of the object 1003 based on the IF signals. The section determination unit 1104 determines, based on the peak positions of the amplitude of the calculated spectrum, sections for which a reflectance of the object 1003 is to be calculated.

The reflectance distribution calculation unit 1105 calculates, for each pair of a transmitting unit 1101 and an associated receiving unit 1102, a reflectance of the object in each of the determined sections based on the IF signals, and further calculates the product of the reflectance distributions over the sections, the reflectance distributions being calculated for the respective pairs. The image generation unit 1106 generates an image using the product of the reflectance distributions calculated for the respective pairs.

In this manner, in the present example embodiment, a spectrum that indicates a distribution of positions of an object (hereinafter referred to as "target object") 1003, which serves as a detection target, is calculated, and, based on the peak positions of the amplitude thereof, sections for calculating a reflectance of the target object 1003 are determined. Then, an image is generated based on the product of the reflectance distributions over the sections. Therefore, according to the present example embodiment, the accuracy of detecting an object using radio waves is improved, and increases in the device cost, size, and weight are suppressed.

Figure 2:
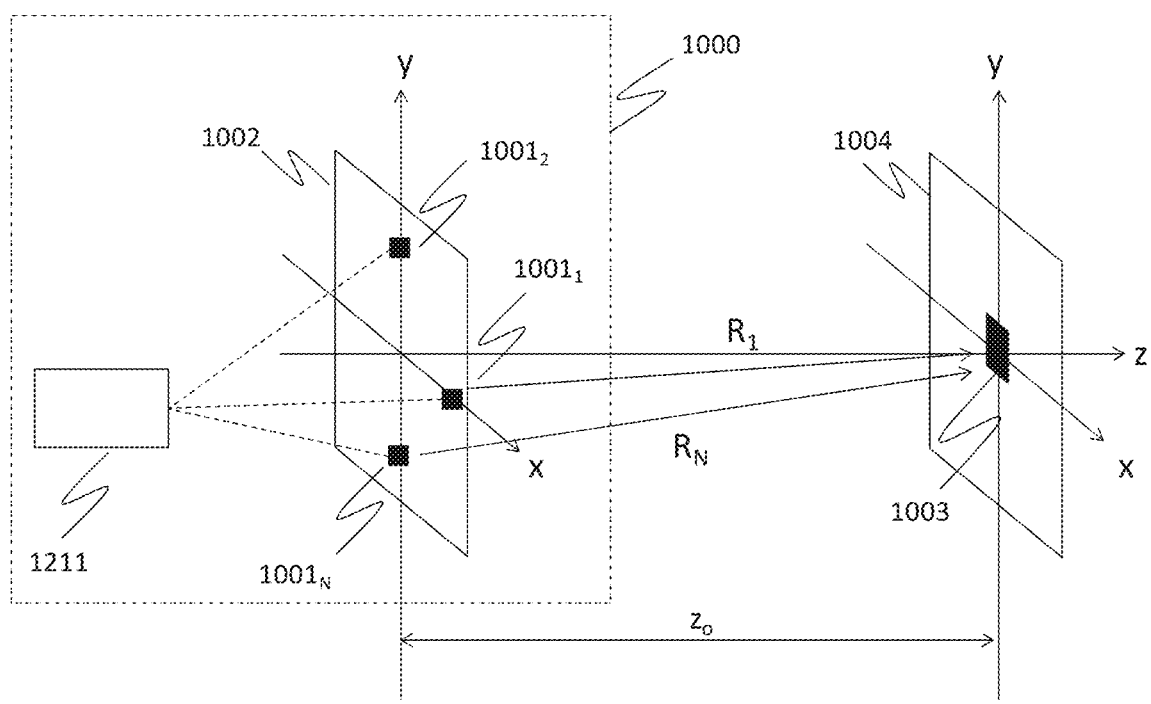
FIG. 2 is a diagram schematically illustrating a configuration of an outer appearance of the object detection apparatus according to the example embodiment of the invention.
Figure 3:
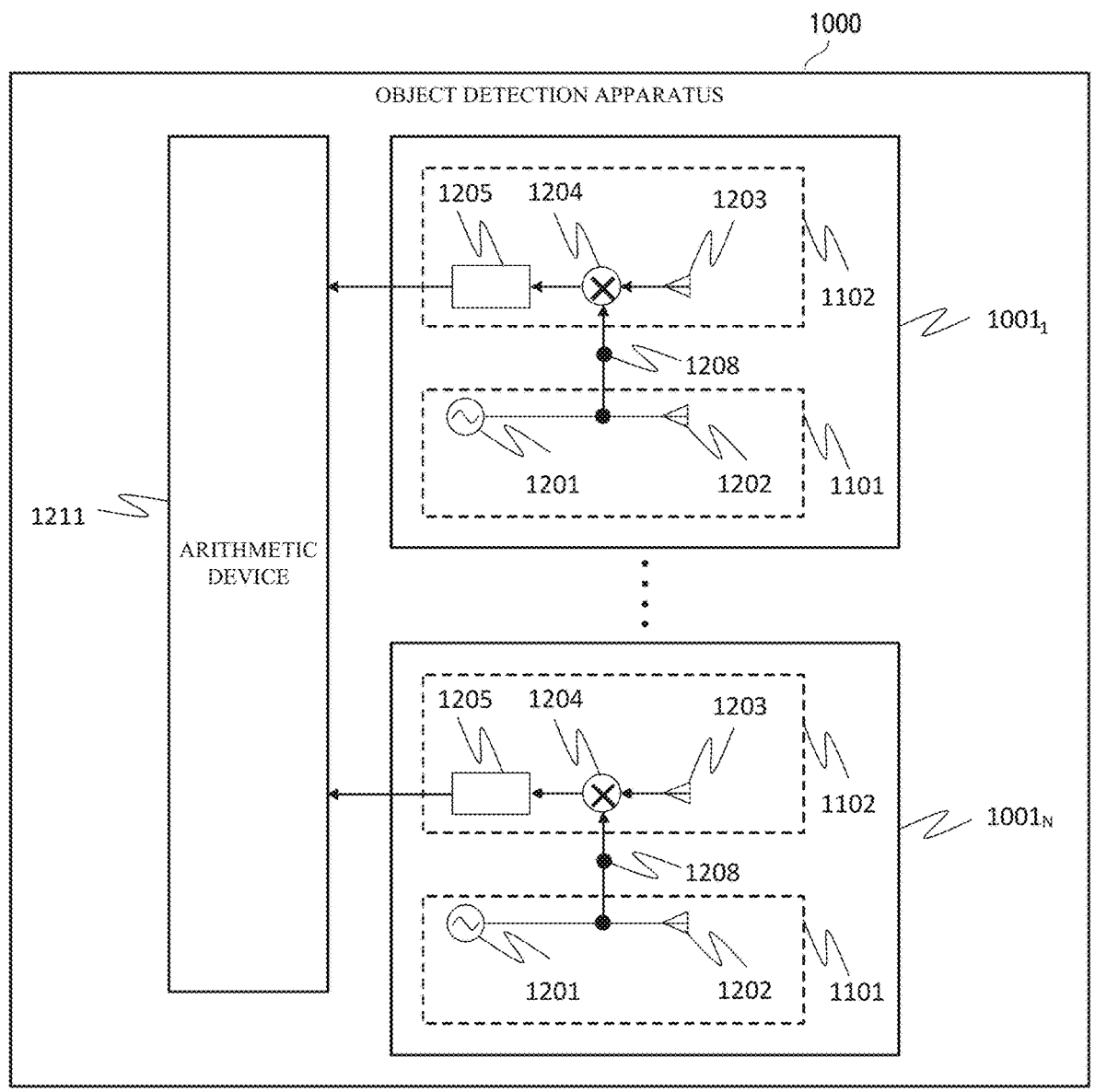
FIG. 3 is a diagram specifically illustrating configurations of a transmitting unit and a receiving unit of the object detection apparatus according to the example embodiment of the invention.
Figure 4:
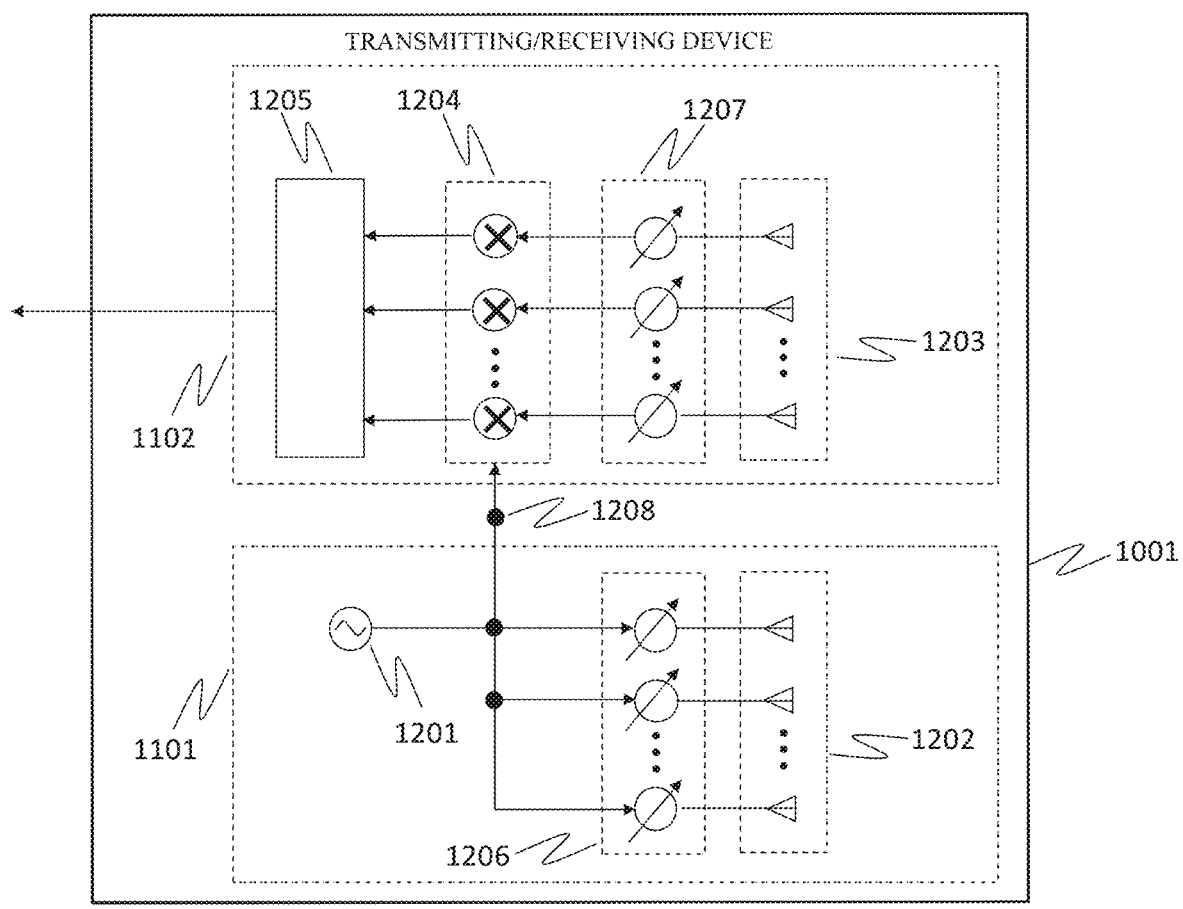
FIG. 4 is a diagram specifically illustrating other configurations of the transmitting unit and the receiving unit of the object detection apparatus according to the example embodiment of the invention.

In the following, the configuration of the object detection apparatus according to the example embodiment will be described more specifically with reference to FIGS. 2 to 4, in addition to FIG. 1. FIG. 2 is a diagram schematically illustrating a configuration of an outer appearance of the object detection apparatus according to the example embodiment of the invention. FIG. 3 is a diagram specifically illustrating configurations of the transmitting unit and the receiving unit of the object detection apparatus according to the example embodiment of the invention. FIG. 4 is a diagram specifically illustrating other configurations of the transmitting unit and the receiving unit of the object detection apparatus according to the example embodiment of the invention.

First, in the present example embodiment, as shown in FIG. 1, one transmitting/receiving device 1001 includes a transmitting unit 1101 and an associated receiving unit 1102. In other words, one pair of a transmitting unit 1101 and a receiving unit 1102 corresponds to one transmitting/receiving device 1001. Furthermore, in the present example embodiment, the spectrum calculation unit 1103, the section determination unit 1104, the reflectance distribution calculation unit 1105, and the image generation unit 1106 are configured by installing a later-described program according to the example embodiment to an arithmetic device (computer) 1211.

Furthermore, as shown in FIG. 1, in the present example embodiment, the transmitting unit 1101 outputs a transmission signal to the receiving unit 1102 via a terminal 1208. The receiving unit 1102 mixes the transmission signal obtained via the terminal 1208 with the received radio wave reflected off the target object 1003, and outputs a resultant IF signal.

Furthermore, as shown in FIG. 2, in the first example embodiment, a plurality of transmitting/receiving devices $1001_1$, $1001_2$, ..., $1001_N$ are arranged on a transmitting/receiving device arrangement plane 1002. The transmitting/receiving devices $1001_1$, $1001_2$, ..., $1001_N$ are connected to the arithmetic device 1211. Here, N is the number of arranged transmitting/receiving devices 1001. Furthermore, the target object 1003 is assumed to be arranged on a target object arrangement plane 1004.

In this case, the transmitting/receiving devices $1001_1$, $1001_2$, ..., $1001_N$ emit radio waves to the target object 1003. Then, the transmitting/receiving devices $1001_1$, $1001_2$, ..., $1001_N$ are assumed to receive the radio waves reflected off the target object 1003. Also, the transmitting/receiving devices $1001_1$, $1001_2$, ..., $1001_N$ respectively calculate, based on the transmitted and received radio waves, distances $R_1$, $R_2$, ..., $R_N$ between the transmitting/receiving devices $1001_1$, $1001_2$, ..., $1001_N$ and the target object 1003.

Furthermore, as shown in FIG. 3, in the present example embodiment, in each of the transmitting/receiving devices $1001_1$, ..., $1001_N$, a transmitting unit 1101 is provided with an oscillator 1201 and a transmitting antenna 1202. Furthermore, a receiving unit 1102 is provided with a receiving antenna 1203, a mixer 1204, and an interface circuit 1205. Also, as described above, the transmitting unit 1101 and the receiving unit 1102 are connected to each other via the terminal 1208.

In the transmitting unit 1101, the oscillator 1201 generates an RF signal (radio wave). The RF signal generated by the oscillator 1201 is transmitted as a transmission signal from the transmitting antenna 1202, and the target object 1003 is irradiated therewith. The radio wave reflected off the target object 1003 is received by the receiving antenna 1203 of the receiving unit 1102.

The mixer 1204 mixes the RF signal input from the oscillator 1201 via the terminal 1208 with the radio wave (reception signal) received by the receiving antenna 1203 to generate an IF signal. The IF signal generated by the mixer 1204 is transmitted to the arithmetic device 1211 via the interface circuit 1205. The interface circuit 1205 functions to convert an IF signal, which is an analog signal, into a digital signal, which can be handled by the arithmetic device 1211, and outputs the obtained digital signal to the arithmetic device 1211.

Note that, in the examples shown in FIGS. 1 and 3, the arithmetic device 1211 is separate from the transmitting/receiving devices $1001_1$, ..., $1001_N$, but the present example embodiment is not limited to this aspect. In the present example embodiment, the arithmetic device 1211 may also be installed in all or any one of the transmitting/receiving devices $1001_1$, ..., $1001_N$.

Furthermore, in the example shown in FIG. 3, one transmitting/receiving device 1001 is provided with one transmitting antenna 1202 and one receiving antenna 1203, but the present example embodiment is not limited to this aspect. In the present example embodiment, for example, as shown in FIG. 4, one transmitting/receiving device 1001 may also be provided with a plurality of transmitting antennas 1202 and a plurality of receiving antennas 1203.

Specifically, in the example of FIG. 4, the transmitting unit 1101 is provided with one oscillator 1201 and a plurality of transmitting antennas 1202. The transmitting unit 1101 is further provided with variable phase shifters 1206 provided for the respective transmitting antennas 1202, and the transmitting antennas 1202 are connected to the oscillator 1201 via the variable phase shifters 1206. The variable phase shifters 1206 respectively control the phases of transmission signals to be supplied from the oscillator 1201 to the transmitting antennas 1202, thereby controlling the directionality of the transmitting antennas 1202.

Furthermore, in the example of FIG. 4, the receiving unit 1102 is provided with one interface circuit 1205 and a plurality of receiving antennas 1203. The receiving unit 1102 is further provided with mixers 1204 provided for the respective receiving antennas 1203, and variable phase shifters 1207 provided similarly for the respective receiving antennas 1203. The receiving antennas 1203 are connected to the interface circuit 1205 via the variable phase shifters 1207 and the mixers 1204.

The variable phase shifters 1207 respectively control the phases of reception signals that are supplied from the receiving antennas 1203 to the mixers 1204, thereby controlling the directionality of the receiving antennas 1203. Note that the variable phase shifters 1207 may also be arranged between the mixers 1204 and the interface circuit 1205.

Figure 5:
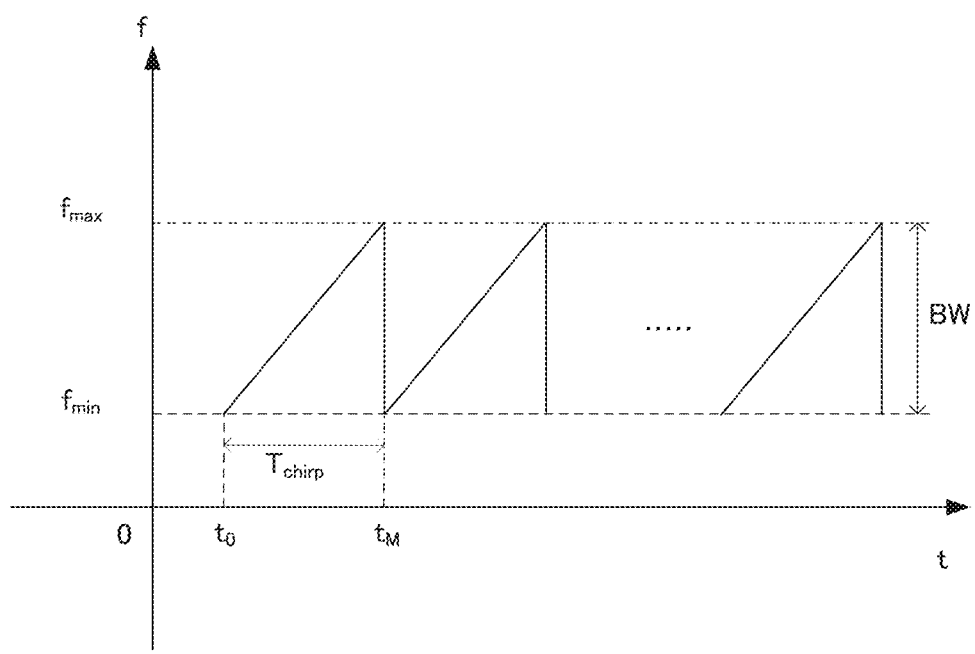
FIG. 5 is a diagram illustrating an example of a transmission signal emitted by the object detection apparatus according to the example embodiment of the invention.
Figure 6:
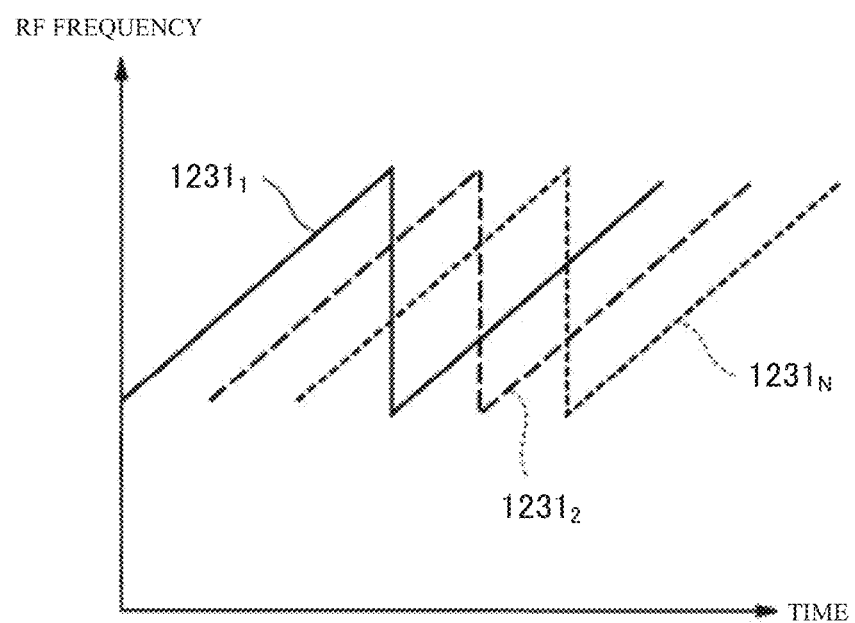
FIG. 6 is a diagram illustrating another example of the transmission signal emitted by the object detection apparatus according to the example embodiment of the invention.

The following will describe a transmission signal that is emitted to an object in the present example embodiment, with reference to FIGS. 5 and 6. FIG. 5 is a diagram illustrating an example of a transmission signal that is emitted by the object detection apparatus according to the example embodiment of the invention. FIG. 6 is a diagram illustrating another example of a transmission signal that is emitted by the object detection apparatus according to the example embodiment of the invention.

First, in the present example embodiment, an RF signal that is generated by the oscillator 1201 is preferably an FMCW signal, as shown in FIG. 5, in which the RF frequency changes from $f_{min}$ to $f_{min}+BW$ with a period $T_{chirp}$. Note that $f_{min}$ is the minimum value of the RF frequency, and BW is the bandwidth of the RF signal.

Furthermore, in the present example embodiment, radio waves are emitted from the transmitting/receiving devices $1001_1, 1001_2, \ldots, 1001_N$ to the target object 1003, and then the radio waves reflected off the target object 1003 are received by the transmitting/receiving devices $1001_1, 1001_2, \ldots, 1001_N$. At this time, each of the transmitting/receiving devices $1001_1, 1001_2, \ldots, 1001_N$ is controlled so as not to operate at the same time as another transmitting/receiving device. In other words, the transmitting/receiving devices $1001_1, 1001_2, \ldots, 1001_N$ are controlled to operate at different timings, and the transmitting units emit radio waves at different timings. By performing control such that the transmitting/receiving devices $1001_1, 1001_2, \ldots, 1001_N$ do not operate at the same time, such a situation where they interfere with each other can be prevented.

Furthermore, in the present example embodiment, if each of the transmitting/receiving devices $1001_1, 1001_2, \ldots, 1001_N$ operates in the same time period as the time period in which another transmitting/receiving device is operated, control may also be performed such that the RF frequencies $1231_1, 1231_2, \ldots, 1231_N$ of the radio waves transmitted from the transmitting/receiving devices $1001_1, 1001_2, \ldots,$ $1001_N$ are not identical, as shown in FIG. 6. With this, interference between transmitting/receiving devices is suppressed.

[Apparatus Operation]

Figure 7:
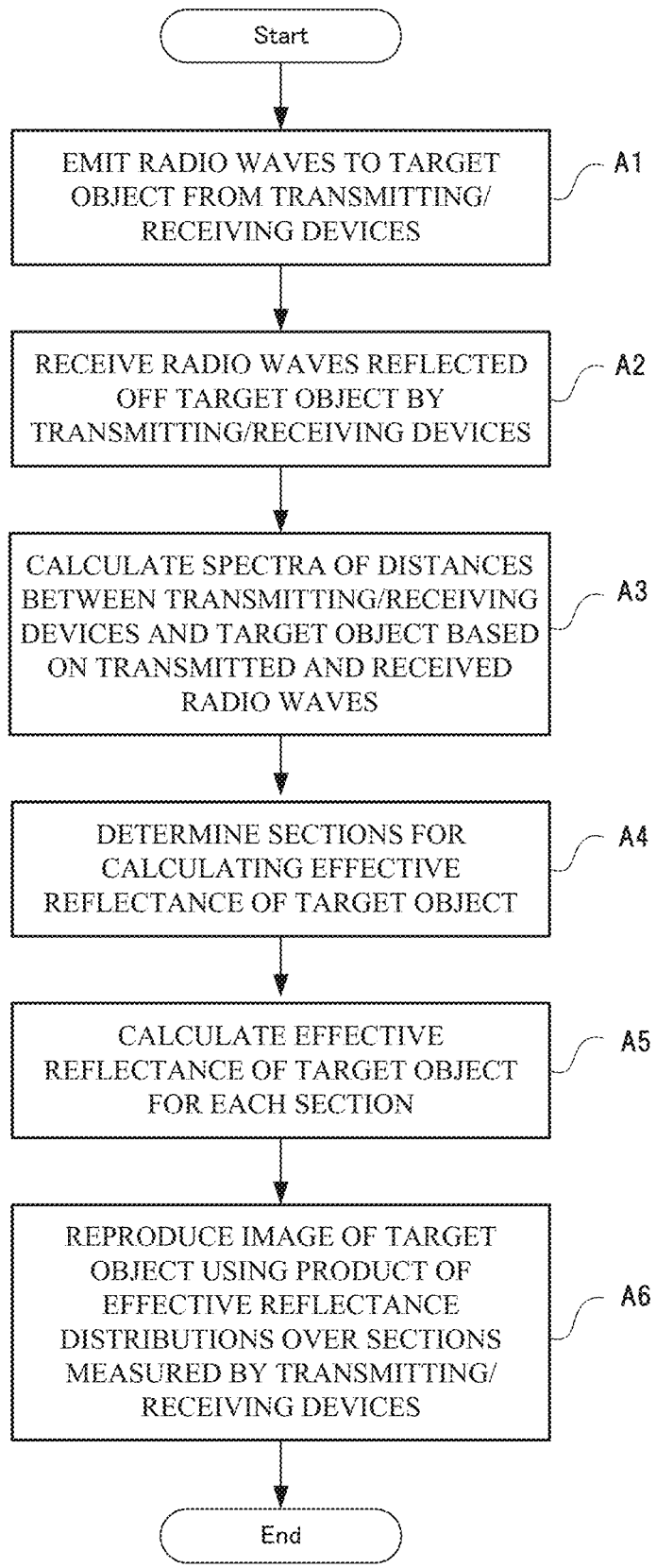
FIG. 7 is a flowchart illustrating an operation of the object detection apparatus according to the example embodiment of the invention.

The following will describe an operation of the object detection apparatus 1000 according to the example embodiment with reference to FIG. 7. FIG. 7 is a flowchart showing an operation of the object detection apparatus according to the example embodiment of the invention. In the following description, FIGS. 1 to 6 are referenced as needed. Furthermore, in the first example embodiment, an object detection method is executed by operating the object detection apparatus 1000. Accordingly, the description of the object detection method according to the example embodiment is replaced by the following description of the operation of the object detection apparatus 1000.

As shown in FIG. 7, first, the transmitting units 1101 of the transmitting/receiving devices $1001_1, 1001_2, \ldots, 1001_N$ sequentially emit, to the target object 1003, radio waves that serve as transmission signals (step A1). Furthermore, the transmitting units 1101 output, at the same time as the emission of radio waves serving as transmission signals, the transmission signals to the receiving units 1102 via the terminals 1208.

Then, the receiving units 1102 of the transmitting/receiving devices $1001_1, 1001_2, \ldots, 1001_N$ receive the radio waves reflected off the target object 1003 as reception signals, and mix the transmission signals generated by the transmitting units 1101 with the received reception signals to generate IF signals (step A2).

Then, the spectrum calculation unit 1103 calculates, based on the IF signals generated in step A2, spectra of distances between each of the transmitting/receiving devices $1001_1, 1001_2, \ldots, 1001_N$, and the target object 1003 (step A3).

Then, the section determination unit 1104 determines, based on the peak positions of the amplitudes of the distance spectra calculated in step A3, sections for calculating the reflectance of the target object 1003 (step A4).

Then, the reflectance distribution calculation unit 1105 calculates, for each of the transmitting/receiving devices $1001_1, 1001_2, \ldots, 1001_N$, the reflectances (effective reflectances) of the target object 1003 in the respective sections determined in step A4, based on the IF signals generated in step A2 (step A5). Also, in step A5, the reflectance distribution calculation unit 1105 further calculates the product of the reflectance distributions over the sections, the reflectance distributions being calculated for the respective transmitting/receiving devices.

Then, the image generation unit 1106 uses the product of the distributions of the reflectances of the target object 1003 over the sections that were calculated for the respective transmitting/receiving devices $1001_1, 1001_2, \ldots, 1001_N$ to generate an image of the target object 1003 (step A6).

Hereinafter, steps A3 to A6 shown in FIG. 7 will be described in further detail with reference to FIGS. 8 to 19.

[Step A3]

First, details of step A3 of calculating spectra of distances between each of the transmitting/receiving devices $1001_1, 1001_2, \ldots, 1001_N$, and the target object 1003 based on the transmitted and received radio waves will be described. In the present example embodiment, in step A3, a null steering direction-of-arrival estimation technique such as the MUSIC method is applied to an FMCW radar, and thus the resolution of distance spectra is improved.

Figure 8:
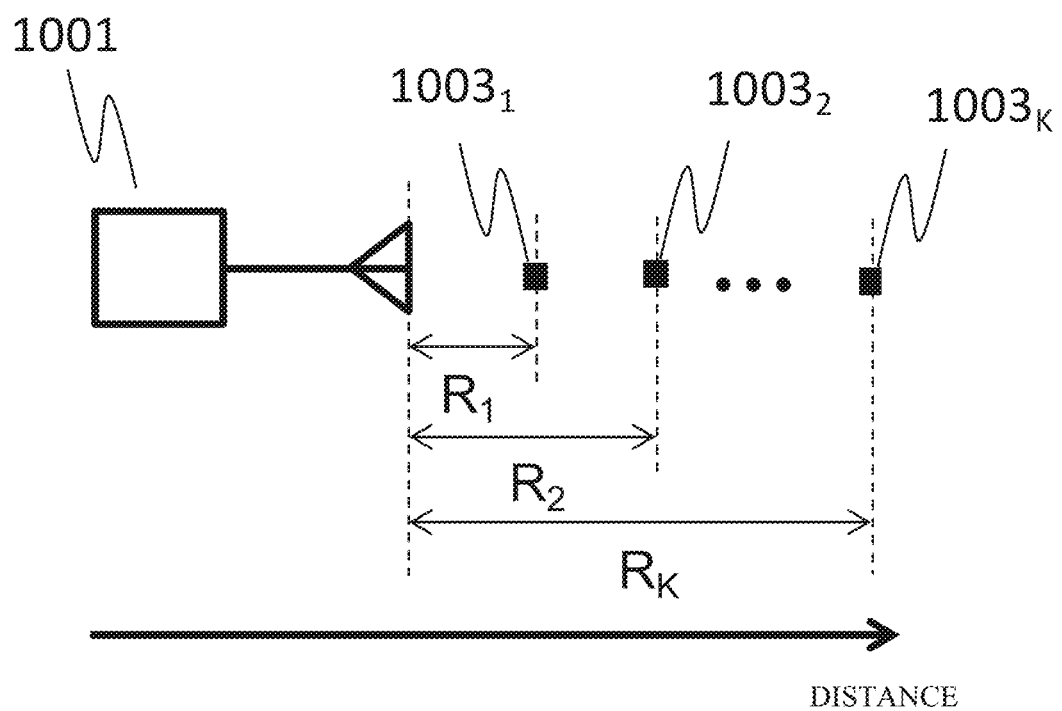
FIG. 8 is a diagram illustrating, when K dot-shaped target objects are arranged, distances between the K dot-shaped target objects and a transmitting/receiving device.

In describing step A3, first, a state is taken as an example in which, as shown in FIG. 8, K dot-shaped target objects $1003_1, 1003_2,$ and $1003_K$ are arranged at positions at which the distances from a transmitting/receiving device 1001 are $R_1, R_2, \ldots, R_K$. The distances $R_1, R_2, \ldots, R_K$ of the target objects are unknown, and it is a task to obtain the distances $R_1, R_2, \ldots, R_K$ of the target objects by performing measurement.

FIG. 8 is a diagram illustrating, when the K dot-shaped target objects are arranged, distances between the dot-shaped target objects and the transmitting/receiving device. In the system shown in FIG. 8, an in-phase component I(t) of a received IF signal is given by Formula (6) below.

[Formula 6]

$$I(t) = \sum_{k=1}^{K} \sigma(R_k) R_k^{-2} \cos[4\pi(f_{min} + \alpha t') R_k/c], \quad t' = t - hT_{chirp}, \quad (6)$$

In Formula (6), $\sigma(R_k)$ is a reflectance of the target object that is present at the distance $R_k$. c is the speed of light. $\alpha$ is the time rate of change of an RF frequency, and $\alpha = BW/T_{chirp}$ is satisfied. t' is a point in time within one chirp period, and takes a value from $-T_{chirp}/2$ to $T_{chirp}/2$. t' is set to be from $-T_{chirp}/2$ to $T_{chirp}/2$, with consideration given to the periodicity of a chirp signal, by subtracting a chirp period ($t'=t-hT_{chirp}$, where h is an integer) each time a chirp period has elapsed.

Furthermore, an orthogonal component Q(t) of the received IF signal is given by Formula (7) below.

[Formula 7]

$$Q(t) = \sum_{k=1}^{K} \sigma(R_k) R_k^{-2} \sin[4\pi(f_{min} + \alpha t') R_k/c], \quad (7)$$

An orthogonal component Q(t) is calculated by using an orthogonal modulator or by performing Hilbert transformation on the in-phase component I(t). Based on the in-phase component and the orthogonal component of the received IF signal, a received complex IF signal r(t) is calculated using Formula (8) below.

[Formula 8]

$$r(t) = I(t) + jQ(t) = \sum_{k=1}^{K} \sigma(R_k) R_k^{-2} \exp[j4\pi(f_{min} + \alpha t') R_k/c], \quad (8)$$

The received complex IF signal r(t) is assumed to be obtained at a sampling time point $t_m$ ($m=1, 2, \ldots, M_0$). $M_0$ is the number of times sampling is performed. It is assumed that the range of $t_m$ is a chirp period. A sampling time period $\Delta t$ is given as $T_{chirp}/M_0$, and $t_m = -T_{chirp}/2 + m\Delta t$ ($m=1, 2, \ldots, M_0$) is obtained. Accordingly, Formula (8) can be expressed as Formula (9) below.

[Formula 9]

$$\begin{aligned} & r = As, \\ & r \equiv [r(t_1), r(t_2), \ldots, r(t_{M_0})]^T, \\ & s \equiv [\sigma(R_1), \sigma(R_2), \ldots, \sigma(R_K)]^T, \\ & A \equiv (a(R_1), a(R_2), \ldots, a(R_K)), \\ & a(R) \equiv R^{-2}[\exp(j\varphi_1(R)), \exp(j\varphi_2(R)), \ldots, \exp(j\varphi_{M_0}(R))]^T, \\ & \varphi_m(R) = 4\pi\alpha(-T_{chirp}/2 + m\Delta t)R/c, \quad (m=1, 2, \ldots, M_0) \end{aligned} \quad (9)$$

Figure 9:
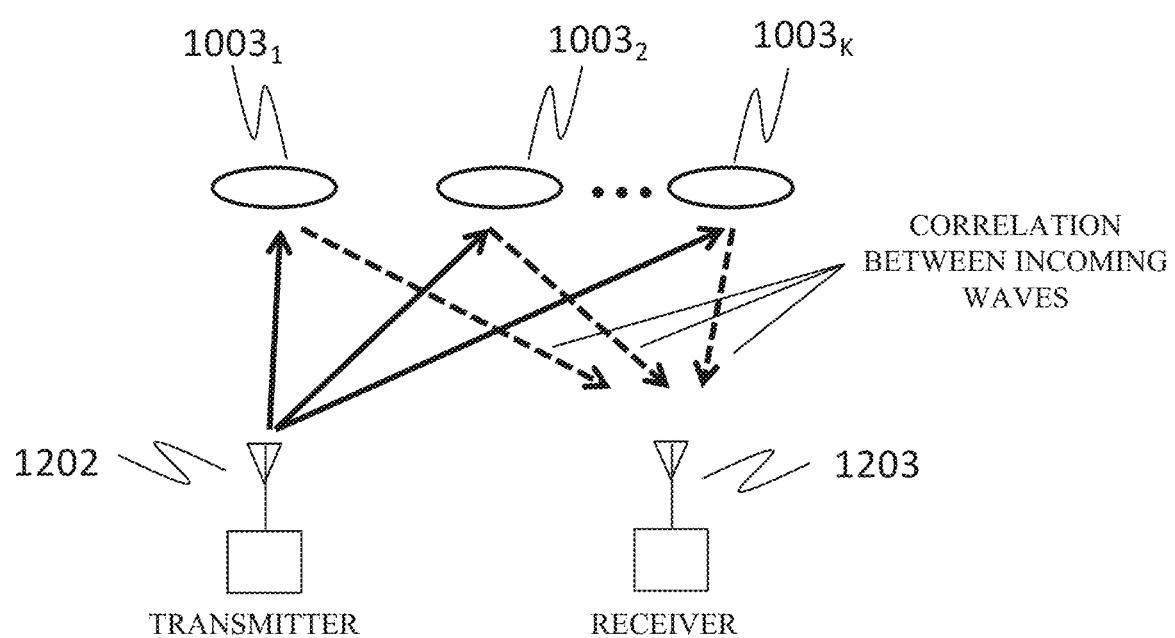
FIG. 9 is a diagram illustrating a state in which reflected waves from the target objects are correlated with each other.

Furthermore, if, as shown in FIG. 9, reflected waves from the different target objects 1003₁, 1003₂, and 1003_K are correlated with each other, it is difficult to accurately estimate the positions of the target objects 1003₁, 1003₂, and 1003_K. FIG. 9 is a diagram illustrating a state in which reflected waves from the target objects are correlated with each other. If they are correlated with each other as shown in FIG. 9, the same signals will arrive at the receiving antenna 1203 from the different target objects 1003₁, 1003₂, and 1003_K, and thus it will be difficult to distinguish the positions of the different target objects 1003₁, 1003₂, and 1003_K.

The problem regarding correlation between reflected waves inevitably occurs as long as the target objects 1003₁, 1003₂, and 1003_K are irradiated with radio waves from the same transmitter (transmitting antenna 1202).

Figure 10:
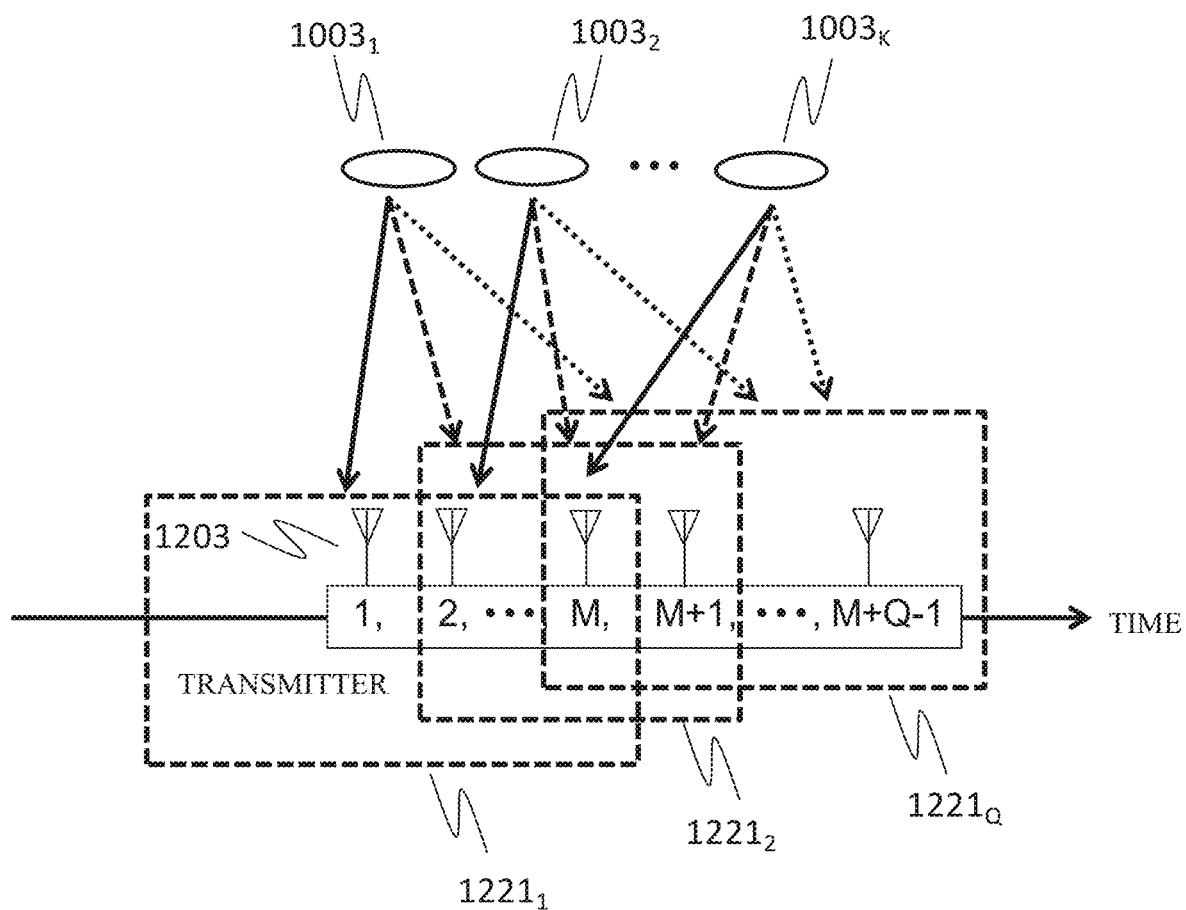
FIG. 10 is a diagram illustrating an example of sub arrays that are configured by a plurality of receiving antennas.

However, the problem regarding correlation between reflected waves can be avoided, by providing, as shown in FIG. 10, a plurality of sub arrays 1221₁, 1221₂, . . . , 1221_Q (where Q is the number of sub arrays) with reception signals whose argument time shifted, and averaging correlation matrixes calculated for the respective sub arrays. FIG. 10 is a diagram illustrating an example of sub arrays configured by a plurality of receiving antennas.

Specifically, the q–th sub array is configured by the q-th to q+M−1-th reception signals of the sub array, that is, $r_q = [r(t_q), r(t_{q+1}), \ldots, r(t_{q+M-1})]^T$. M is the number of times sampling is performed, and configures each sub array. The correlation matrix $R_{col(q)}$ obtained based on the q-th sub array is calculated using Formula (10) below.

[Formula 10]

$$R_{col(q)} = r_q r_q^H, \quad (10)$$

It is assumed that an average of correlation matrixes $R_{col(q)}$ (q=1, 2, . . . , Q) of all of the sub arrays is defined as $R_{all}$. The number Q of sub arrays is set to be not smaller than the number K of target objects.

In the above-described method, as a result of using the characteristics that the correlation between reception signals of different sub arrays deteriorates, the problem resulting from correlation between reflected waves is avoided.

Then, using the correlation matrix $R_{all}$ and a direction vector a(R) defined by Formula (9), an evaluation function (MUSIC spectrum) $P_{MU}(R)$ is calculated as shown by Formula (11) below.

[Formula 11]

$$P_{MU}(R) = \frac{a^H(R)a(R)}{a^H(R)E_N E_N^H a(R)}, \quad (11)$$

Here, $E_N = [e_{K+1}, \ldots, e_M]$ is satisfied, and $e_n$ (n=K+1, . . . , M) is (M−K) vectors that have the smallest characteristic number of the characteristic vectors of the correlation matrix $R_{all}$. The evaluation function $P_{MU}(R)$ of Formula (11) has an extreme value (peak) at a position $R_k$ (k=1, 2, ..., K) at which an object is present. Accordingly, due to the characteristics of the evaluation function shown in Formula (11) above, the distances $R_1, R_2, ..., R_K$ of the target objects $1003_1, 1003_2, ..., 1003_K$ can be detected based on the positions at which the evaluation function $P_{MU}(R)$ has the peak.

Figure 11:
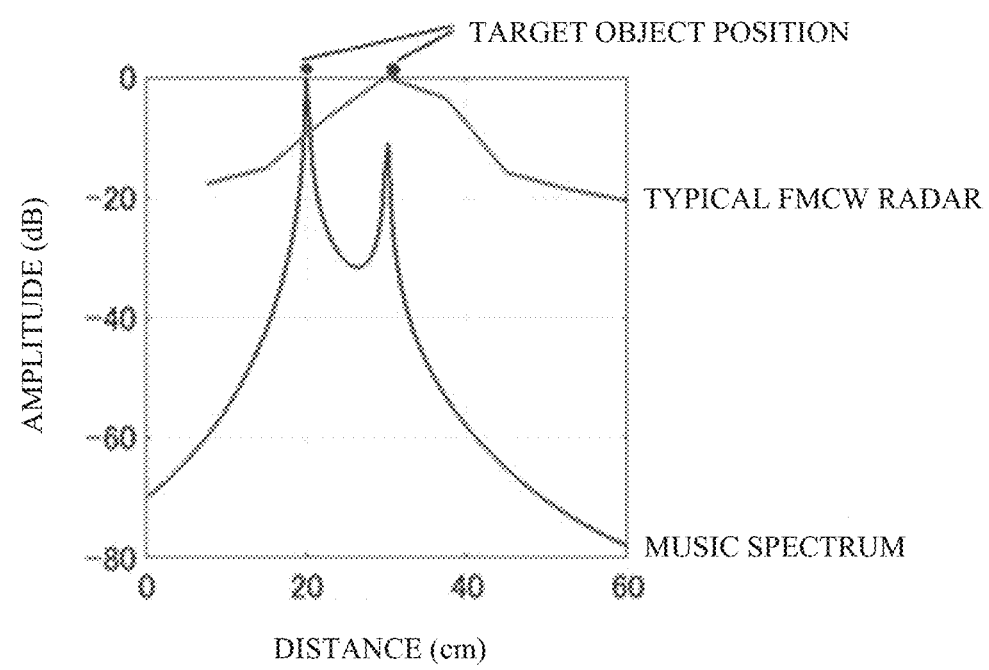
FIG. 11 is a diagram illustrating an example of a spectrum that indicates a distribution of positions of an object obtained in the example embodiment of the invention.

Specifically, if the target objects 1003 are arranged at positions at which the distances from the transmitting/receiving device 1001 are 20 cm and 30 cm, and a spectrum of the distances of the target objects 1003 is obtained using the transmitting/receiving device 1001 that uses radio waves of the RF frequencies of 18 to 20 GHz, the result is as shown in FIG. 11. FIG. 11 is a diagram illustrating an example of a spectrum that indicates a distribution of positions of the objects that are obtained in the example embodiment of the invention.

If a typical FMCW radar is used, due to its poor resolution capabilities, it is difficult to distinguish the target objects that are arranged at the positions 20 cm and 30 cm from the transmitting/receiving device. In contrast, if the MUSIC spectrum of Formula (11) above is used, it is possible, as shown in FIG. 11, to distinguish the objects that are arranged at the positions 20 cm and 30 cm from the transmitting/receiving device. In other words, by using the MUSIC spectrum of Formula (11), resolution can be improved, relative to a typical FMCW radar.

[Step A4]

Figure 12:
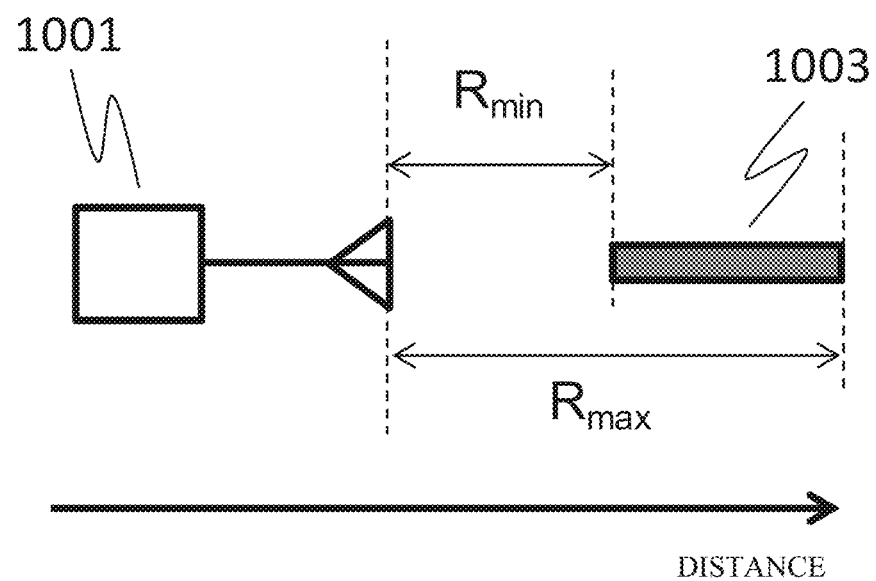
FIG. 12 is a diagram illustrating, when a continuum-shaped target object is arranged, distances between the continuum-shaped target object and the transmitting/receiving device.
Figure 13:
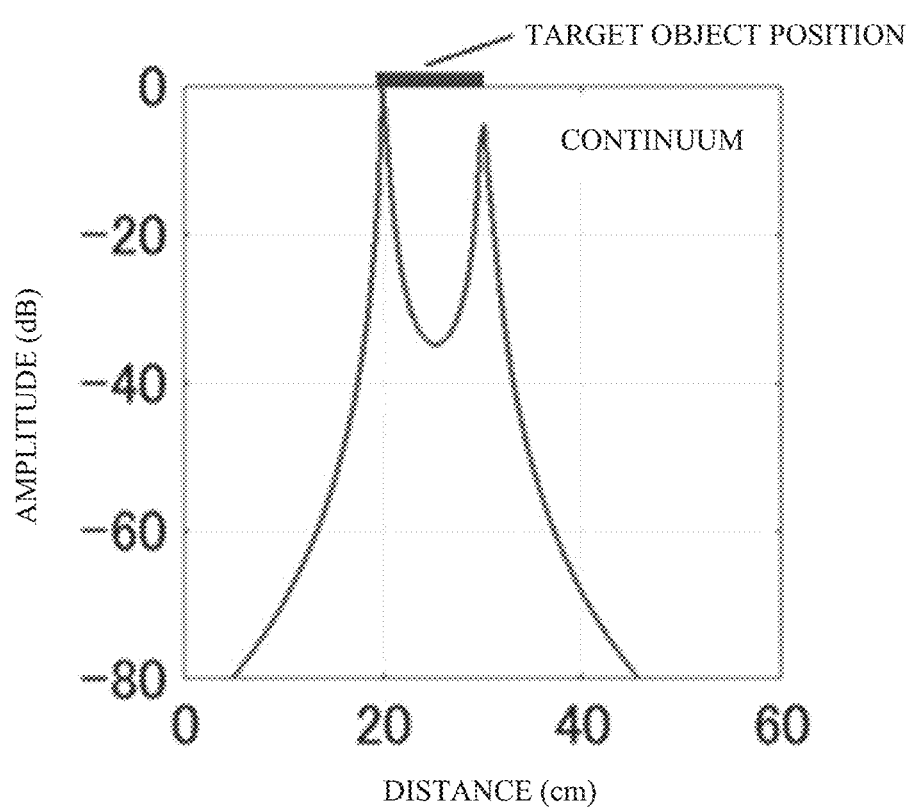
FIG. 13 is a diagram illustrating another example of a spectrum that indicates a distribution of positions of an object obtained in the example embodiment of the invention.

Hereinafter, a state is taken as an example in which, as shown in FIG. 12, a continuum-shaped target object 1003 whose distance from the transmitting/receiving device 1001 is in a range from $R_{min}$ to $R_{max}$ is arranged. A result of the spectrum of distances of the continuum-shaped target object 1003 distributed between the distances 20 cm and 30 cm is shown in FIG. 13, the result being obtained using the MUSIC spectrum of Formula (11) by the transmitting/receiving device 1001 that uses radio waves of the RF frequencies of 18 to 20 GHz. FIG. 12 is a diagram illustrating, when the continuum-shaped target object is arranged, the distance between the continuum-shaped target object and the transmitting/receiving device. FIG. 13 is a diagram illustrating another example of a spectrum of distribution of positions of the object obtained in the example embodiment of the invention.

As shown in FIG. 13, in the MUSIC spectrum, only the positions at ends of the continuum-shaped target object 1003 are detected as peaks. In other words, with the MUSIC spectrum of Formula (11), it is impossible to capture an entire image of the continuum-shaped target object 1003. The reason why this issue occurs is that, in the derivations of Formulae (6) to (11), the dot-shaped target objects $1003_1$, $1003_2, ..., 1003_K$ are assumed as target objects, and the continuum-shaped target object is not assumed as an target object.

Figure 14:
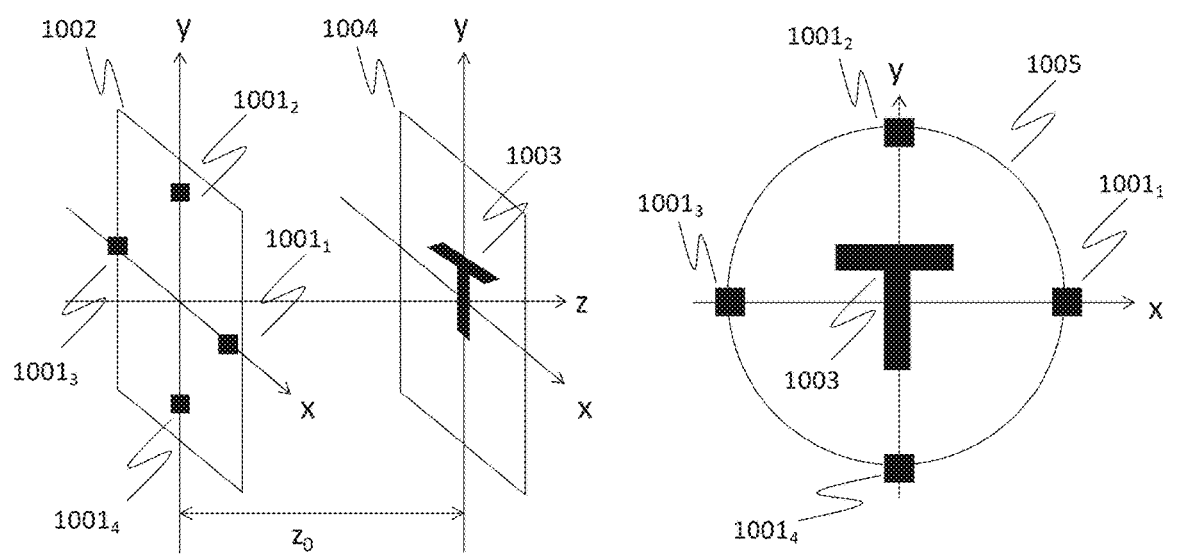
FIG. 14 are diagrams illustrating, when a target object is T-shaped, a positional relationship between the T-shaped target object and the transmitting/receiving device.

Therefore, step A4 is required to reproduce the overall image of the continuum-shaped target object 1003. Hereinafter, step A4 will be specifically described with reference to FIG. 14. FIG. 14 are diagrams illustrating the positional relationship between a T-shaped target object and the transmitting/receiving devices. Note that FIG. 14 are also referenced for description of the later-described steps A5 and A6.

In the example shown in FIG. 14, four transmitting/receiving devices $1001_1, 1001_2, 1001_3,$ and $1001_4$ are arranged on a circle 1005 on the device arrangement plane 1002. Furthermore, a T-shaped target object 1003 is arranged on the target object arrangement plane 1004.

Figure 15:
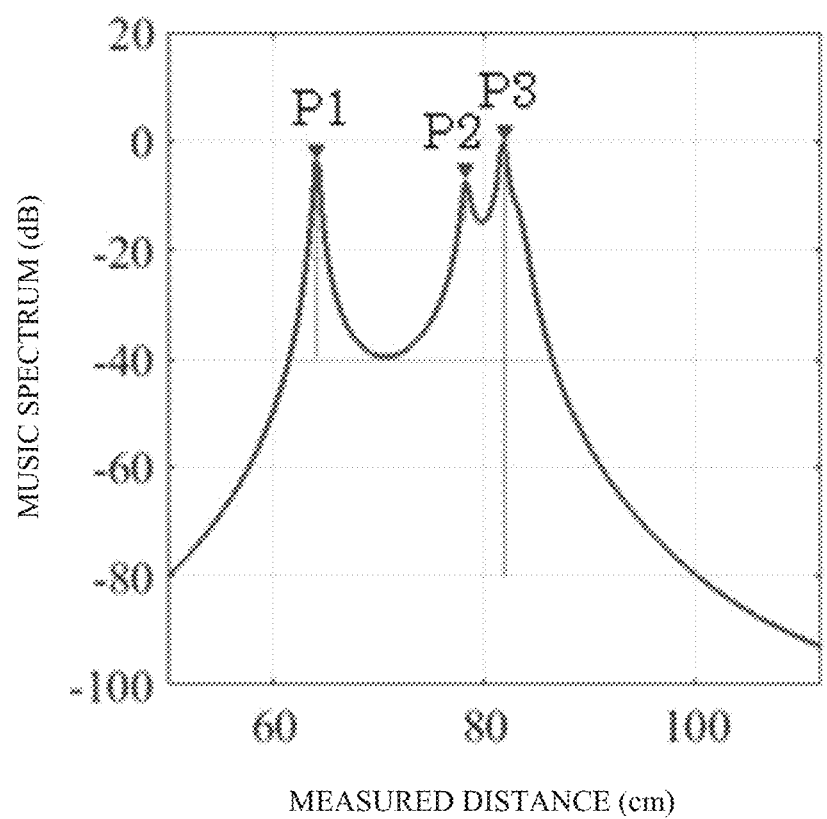
FIG. 15 is a diagram illustrating a spectrum that indicates a distribution of positions of the object obtained in the arrangement shown in FIG. 14.

A MUSIC spectrum of the target object 1003 is shown in FIG. 15 that is obtained by the transmitting/receiving device $1001_4$ in a state in which, in the arrangement shown in FIG. 14, the RF frequency is set to 18 to 20 GHz (bandwidth=2 GHz), the number $M_0$ of times sampling is performed is set to 101, and a sub array count Q is set to 75. FIG. 15 is a diagram illustrating a spectrum that indicates a distribution of positions of the object obtained in the arrangement shown in FIG. 14.

Figure 16:
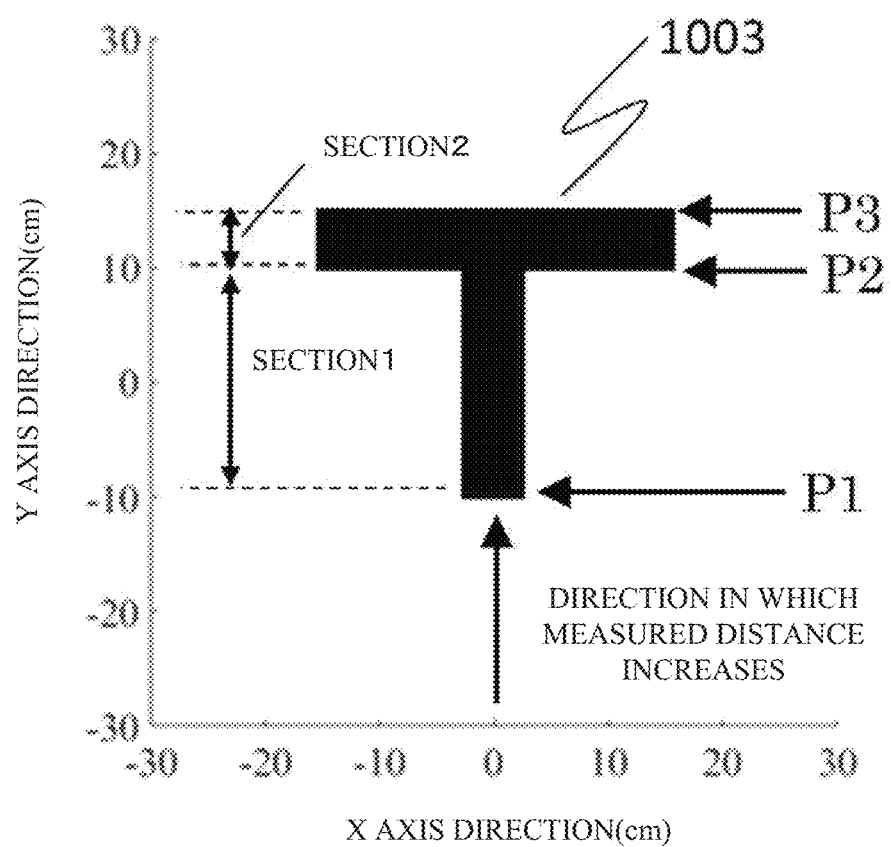
FIG. 16 is a diagram specifically illustrating the shape of the target object shown in FIG. 14.

In the MUSIC spectrum shown in FIG. 15, there are three peaks of P1, P2, and P3. Also, the peaks P1, P2, and P3 of the MUSIC spectrum shown in FIG. 15 respectively correspond to discontinuity points (ends) P1, P2, and P3 of the target object 1003 shown in FIG. 16. FIG. 16 is a diagram illustrating the specific shape of the object shown in FIG. 14.

Then, in step A4, based on the peak information of the MUSIC spectrum, as shown in FIG. 16, a space between the peaks P1 and P2, and a space between the peaks P2 and P3 are respectively determined as sections (a section 1 and a section 2). The number of sections is equal to the value obtained by subtracting 1 from the number of peaks.

[Step A5]

Figure 17:
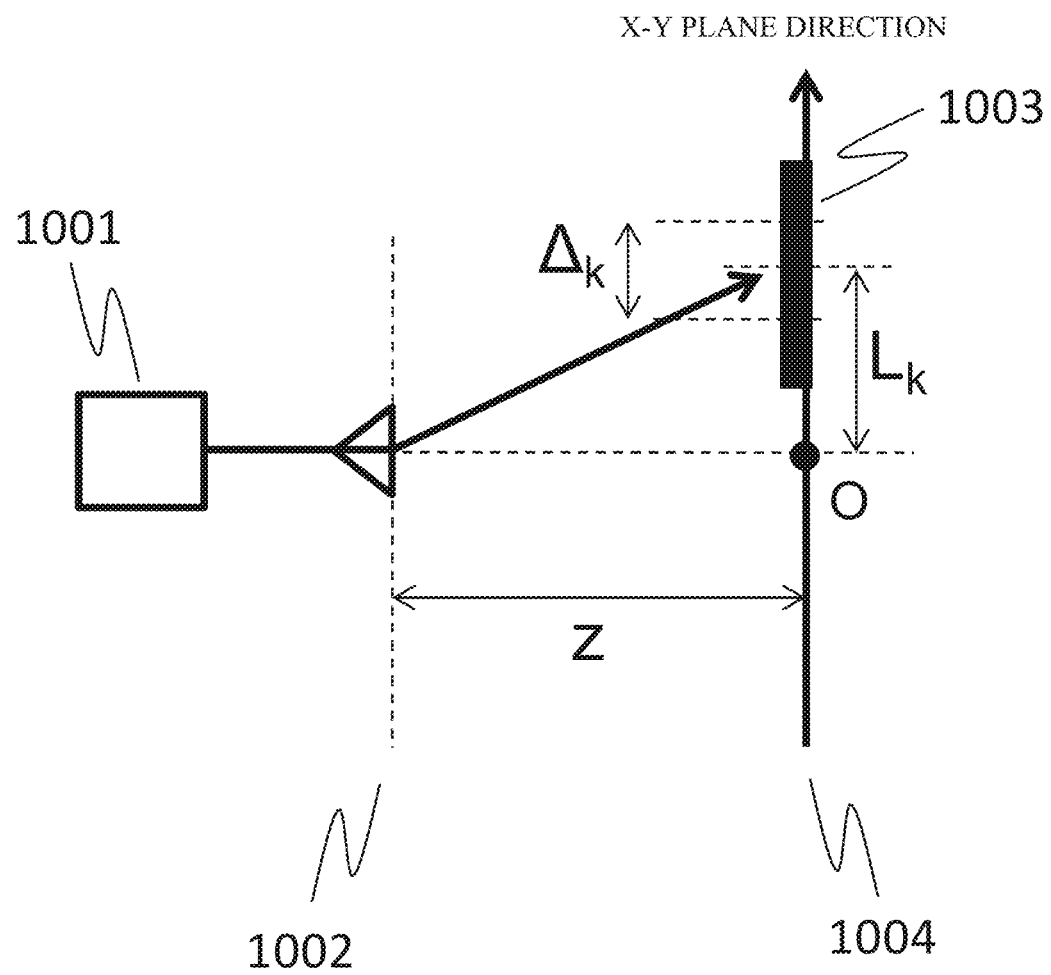
FIG. 17 is a diagram illustrating a relationship between a section determined in step A4 shown in FIG. 7 and a target object.

The following will describe step A5. As shown in FIG. 17, the distance between the device arrangement plane 1002 and the target object arrangement plane 1004 is set as "z", and the point on the target object arrangement plane at which the distance from the transmitting/receiving device 1001 is minimum is set as "O". It is assumed that a target object with a section width $\Delta k$ is present with its center position set at a distance $L_k$ (k=1, 2, ..., K) from O. This section corresponds to a section defined by peaks of the MUSIC spectrum shown in FIG. 15. FIG. 17 is a diagram illustrating a relationship between the sections determined in step A4 shown in FIG. 7, and the target object.

Also, a complex IF signal r(t) that is obtained based on the reflected waves from the continuum-shaped target object 1003 is given by Formulae (12) and (13) below.

[Formula 12]

$$r(t) = \sum_{k=1}^{K} \int_{L_k-\Delta_k/2}^{L_k+\Delta_k/2} \sigma'(L)(L^2+z^2)^{-1} \exp\left(j\frac{4\pi}{c}(f_{min}+\alpha t)\sqrt{L^2+z^2}\right) dL \quad (12)$$

$$\cong \sum_{k=1}^{K} \sigma'(L_k)h(t, L_k)$$

[Formula 13]

$$h(t, L_k) \equiv \int_{L_k-\Delta_k/2}^{L_k+\Delta_k/2} (L^2+z^2)^{-1} \exp\left(j\frac{4\pi}{c}(f_{min}+\alpha t)\sqrt{L^2+z^2}\right) dL \quad (13)$$

σ'(L) in Formula (12) is an effective reflectance, and is set as an amount that is proportional to the width, in an angular direction (direction that is perpendicular to the distance direction), of the target object and the reflectance thereof. The approximation carried out at the shift from the first to second rows of Formula (12) is effective when the effective reflectance σ'(L) does not largely change in the section $[L_k-\Delta_k/2, L_k+\Delta_k/2]$. In other words, in the section $[L_k-\Delta_k/2, L_k+\Delta_k/2]$, it is premised that the width, in the angular direction, of the target object, and the reflectance thereof hardly change.

When Formula (8) for a complex IF signal in the case of dot-shaped target objects as described in step A3 and the formula in the case of a continuum as described in step A4 are compared with each other, the continuum is characterized in that continuously distributed reflected waves of the target object are synthesized using integration.

Then, a direction matrix $A_K$ is defined as shown in Formula (14) below.

[Formula 14]

$$a(L)=[h(t_1,L),h(t_2,L),\ldots,h(t_{M0},L)]^T,$$

$$A_K=[a(L_1),a(L_2),\ldots,a(L_K)]^T, \quad (14)$$

In Formula (14), the direction matrix $A_K$ is a known amount that is configured by known parameters.

All pieces of sampling data $r_0=[r(t_1), r(t_2), \ldots, r(t_{M0})]^T$, direction matrix $A_K$, and reflectance $s=[\sigma'(L_1), \sigma'(L_2), \ldots, \sigma'(L_K)]$ in sections, of the received IF signal have the relationship shown in Formula (15) below.

[Formula 15]

$$r_0 = A_K \cdot S, \quad (15)$$

Then, using all pieces of sampling data $r_0=[r(t_1), r(t_2), r(t_{M0})]^T$ of the received IF signal, a correlation matrix $R_{col(0)}$ is calculated using Formula (16) below.

[Formula 16]

$$R_{col(0)} = r_0 \cdot r_0^H, \quad (16)$$

The correlation matrix $R_{col(0)}$ is a known amount that can be calculated based on the received IF signal $r_0$ obtained as actually-measured data or simulation data.

Also, based on Formulae (15) and (16) above, the relationship shown in Formula (17) below is obtained.

[Formula 17]

$$R_{col(0)} = A_K \cdot S \cdot A_K^H,$$

$$S \equiv \{S_{ij}\} = \sigma'(L_i) \cdot \{\sigma'(L_j)\}^*, \quad (17)$$

Also, by applying a pseudo-inverse matrix of $A_K$ to Formula (17), S can be calculated using Formula (18) below.

[Formula 18]

$$S = (A_K^H \cdot A_K)^{-1} \cdot A_K^H \cdot R_0 \cdot A^K \cdot (A_K^H \cdot A_K)^{-1}, \quad (18)$$

Based on a diagonal component of S obtained by using Formula (18), an effective reflectance $|\sigma'(L_k)|^2$ (k=1, 2, ..., K) of the target object in each section can be obtained.

Figure 18:
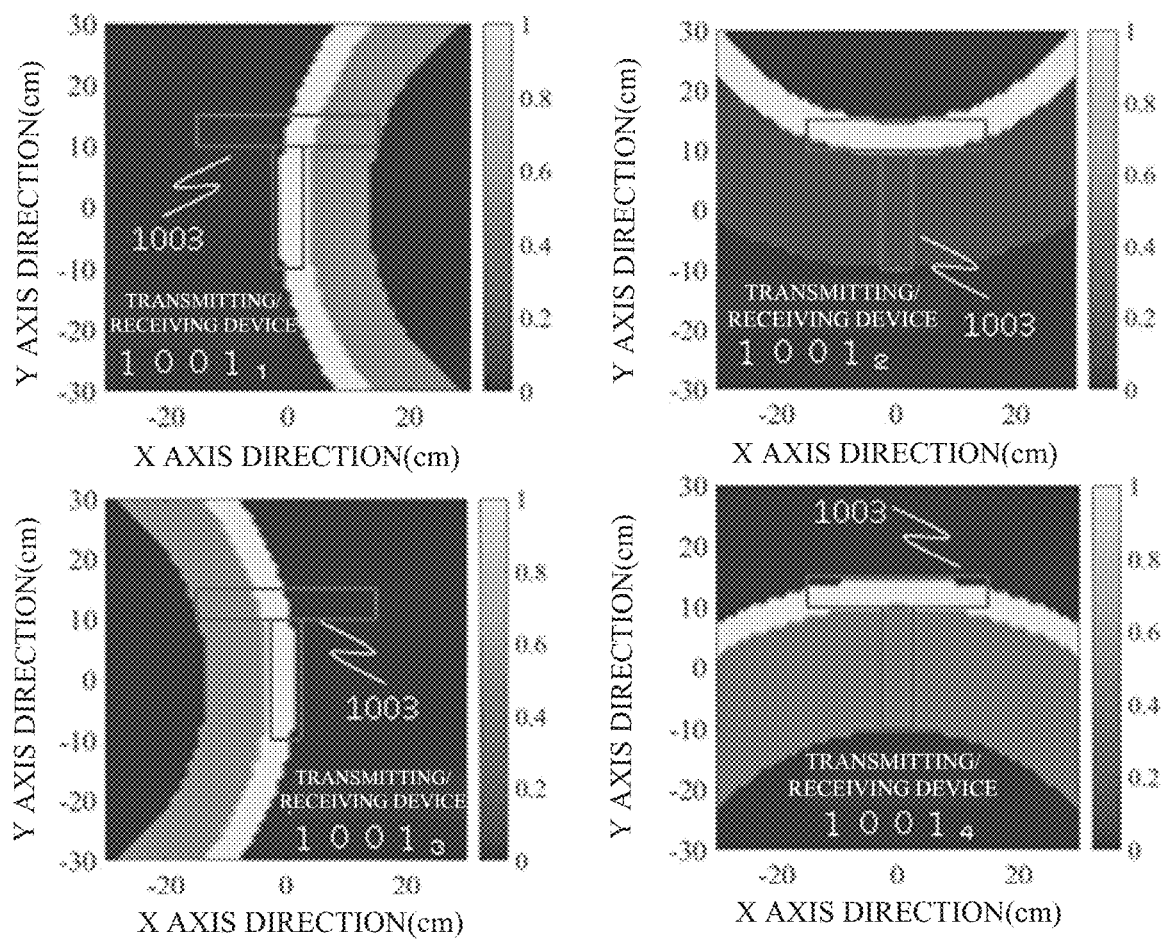
FIG. 18 are diagrams illustrating examples of calculation results of a reflectance of the target object calculated in step A5 shown in FIG. 7.

Here, calculation results of the effective reflectances of the target object 1003 in the sections obtained in step A5 are shown in FIG. 18. FIG. 18 are diagrams illustrating examples of calculation results of the reflectances of the target object calculated in step A5 shown in FIG. 7. In the examples of FIG. 18, pieces of data obtained from the transmitting/receiving devices $1001_1$ to $1001_4$ are shown.

The transmitting/receiving devices $1001_1$ to $1001_4$ can respectively measure positions of a target object in the distance direction (direction toward the target object when viewed from the transmitting/receiving devices $1001_1$ to $1001_4$). However, it is difficult for the transmitting/receiving devices $1001_1$ to $1001_4$ to measure positions in the angular direction (direction toward a side of the target object when viewed from the transmitting/receiving devices $1001_1$ to $1001_4$). Accordingly, sections are defined only in the distance direction. Also, a section is a region on the target object plane 1004 that is enclosed, for each of the transmitting/receiving devices $1001_1$ to $1001_4$, by a circle with O (FIG. 17) serving as an original point. Because effective reflectances have the same value in a section, they appear to have a doughnut-shaped distribution.

Effective reflectance is an amount that is proportional to the width, in the angular direction, of the target object 1003, and the reflectance thereof. Because the reflectances of the target object 1003 are uniform, the effective reflectance of the pattern of a larger width in the angular direction when viewed from the transmitting/receiving device 1001 has a particularly large value. For example, when the transmitting/receiving device $1001_1$ or $1001_3$ is used to perform measurement, the effective reflectance of the vertical bar portion of the target object 1003 is high. On the other hand, when the transmitting/receiving device $1001_2$ or $1001_4$ is used to perform measurement, the effective reflectance of the horizontal bar portion of the target object 1003 is high.

Hereinafter, the number of sections will be described. In the above-described procedure, a space between ends of a target object detected using peaks of a MUSIC spectrum is defined as a section. However, formally, Formulae (12) to (18) can be calculated by using any section $[L_k-\Delta_k/2, L_k+\Delta_k/2]$ (k=1, 2, ..., K) without using MUSIC spectrum information. Note however that, if the number of sections is increased, $A_K$ will numerically approach non regular, and errors may occur in the calculation of Formula (18), and a correct result can no longer be obtained. Accordingly, there is no need to increase the number of sections any more than necessary, but there is a need to set sections for which a correct result can be obtained.

The discussion of Formula (12) has mentioned that a preferable condition for setting a section is that the width, in the angular direction, of a target object and the reflectance thereof hardly change in the section $[L_k-\Delta_k/2, L_k+\Delta_k/2]$, that is, a target object does not have discontinuity in the section. This section setting condition can be satisfied by setting a space between ends of a target object detected by using peaks of a MUSIC spectrum.

[Step A6]

The following will describe step A6. First, an effective reflectance distribution on an X-Y plane of a transmitting/receiving device $1001_n$ (n=1, 2, ..., N, and in the example of FIG. 18, N=4) shown in FIG. 18 is set as $\sigma'_n(x, y)$. The ultimately obtained image $I(x, y)$ is calculated using the product of the effective reflectance distributions $\sigma'_n(x, y)$ obtained for the transmitting/receiving devices $1001_n$ (n=1, 2, ..., N), as shown in Formula (19).

[Formula 19]

$$I(x, y) = \left[\prod_{n=1}^{N} \sigma'_n(x, y)\right]^{\delta/N}, \quad (19)$$

Figure 19:
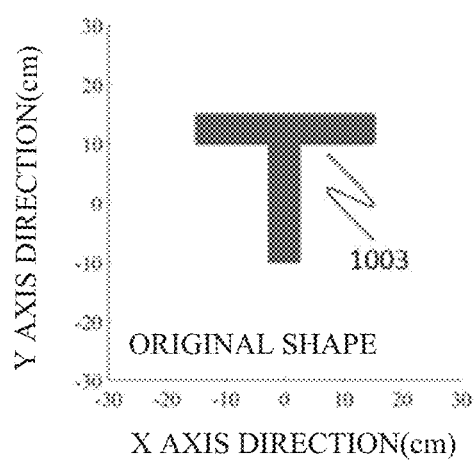
FIG. 19 are diagrams illustrating examples of images of the target object generated in the present example embodiment.
Figure 19:
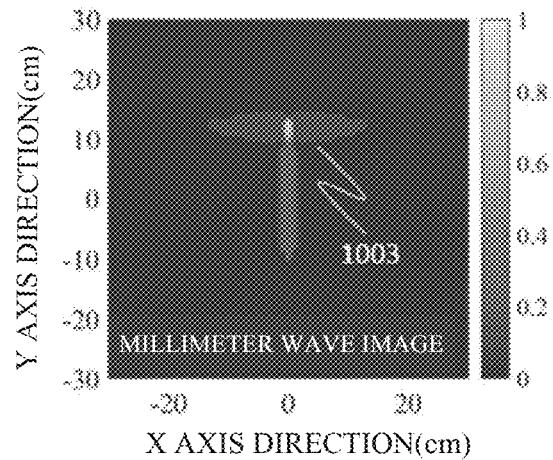

In Formula (19), $\delta$ is a parameter for adjusting a dynamic range of an image. A millimeter wave image obtained when $\delta=2$ based on Formula (19) is shown in FIG. 19. FIG. 19 illustrate examples of images of a target object generated in the present example embodiment. As shown in FIG. 19, in the present example embodiment, when the original shape is a T shape with a width of 5 cm, also the millimeter wave image obtained by measurement with the bandwidth 2 GHz has the same T shape as the original shape, as a result of executing steps A1 to A6.

Effects of Example Embodiment

Hereinafter, effects of the example embodiment are summarized. A typical conventional array antenna method requires a larger number of antennas to perform direction-of-arrival (angular direction) estimation of received radio waves than in the present example embodiment. On the other hand, the present example embodiment employs a method for detecting the shape of a target object based on a result of measurement of a distance between the transmitting/receiving device and the target object, rather than a conventional method for direction-of-arrival estimation of radio waves, that is, angular direction measurement. Accordingly, several transmitting/receiving devices each provided with one transmitting antenna and one receiving antenna can realize the same functions as those in a typical array antenna method. Accordingly, in the present example embodiment, the actual number of antennas can be significantly reduced relative to those in a typical array antenna method.

In the synthetic aperture radar method, a receiver needs to be mechanically moved, which involves the problem that detection and inspection of an object require time. On the other hand, in the present example embodiment, only the RF frequency of transmitted radio waves, instead of the position of the receiver, needs to be electronically scanned, and thus it is possible to reduce time required to detect and inspect an object compared to that in a case of the synthetic aperture radar method.

Since a conventional radar that measures a distance using the FMCW method has poor resolution, there is the problem that the shape of a target object cannot be accurately detected. On the other hand, in the present example embodiment, a null steering direction-of-arrival estimation technique such as the MUSIC method is applied to an FMCW radar, and thus the resolution of a distance spectrum is improved.

Furthermore, there is also the problem that only applying a null steering direction-of-arrival estimation technique such as the MUSIC method to the FMCW radar does not allow detection of the shape of the entire target object, because only the ends of the target object are detected. In contrast, in the present example embodiment, sections for which an effective reflectance of a target object is to be calculated are determined using peak positions of the amplitude of the distance spectrum, the effective reflectance of the target object is calculated for each section, and an image of the target object is reproduced using the product of the effective reflectances in the sections that were measured by the respective transmitting/receiving devices, and thus detection of the shape of the entire target object can be realized.

In summary, in the object detection apparatus and the object detection method according to the example embodiment, it is possible to reduce the number of required antennas and associated receivers compared to a case where a typical array antenna method is employed, and thus effects of being able to reduce the device cost, size, and weight can be achieved. Furthermore, in contrast to a typical synthetic aperture radar method, in the object detection apparatus and the object detection method according to the example embodiment, there is no need to mechanically move the apparatus, and thus effects of being able to reduce time required for object detection and inspection can also be achieved.

According to the present example embodiment, by emitting radio waves whose RF frequencies change over time to a detection target object, and detecting the radio waves that were reflected off the target object or emitted from the target object, an image of the detection target object can be generated. Therefore, according to the present example embodiment, it is possible to reduce the number of required antennas and receivers compared to those in a conventional case, and realize image generation with high-speed scanning without the need to move a receiver.

[Program]

A program according to the example embodiment is preferably a program that causes a computer, namely, the arithmetic device 1211 to execute steps A3 to A6 shown in FIG. 7. By installing this program to the arithmetic device 1211 and executing it, the object detection apparatus and the object detection method according to the example embodiment can be realized. In this case, the processor of the arithmetic device 1211 functions as the spectrum calculation unit 1103, the section determination unit 1104, the reflectance distribution calculation unit 1105, and the image generation unit 1106, and performs processing.

Furthermore, the program according to the example embodiment may also be executed by a computer system configured by a plurality of computers. In this case, for example, each of the computers may also function as any one of the spectrum calculation unit 1103, the section determination unit 1104, the reflectance distribution calculation unit 1105, and the image generation unit 1106.

Figure 20:
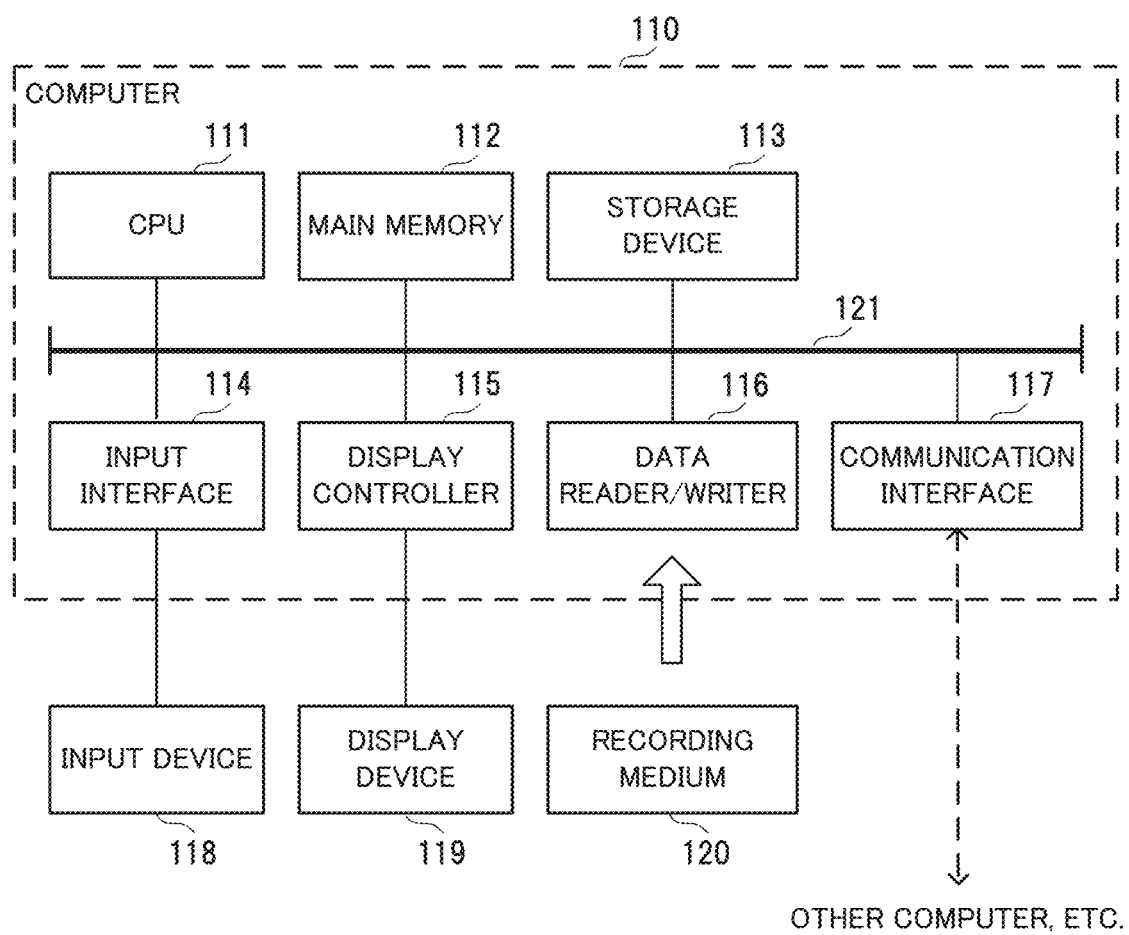
FIG. 20 is a block diagram illustrating an example of a computer that realizes the object detection apparatus according to the example embodiment of the invention.
Figure 21:
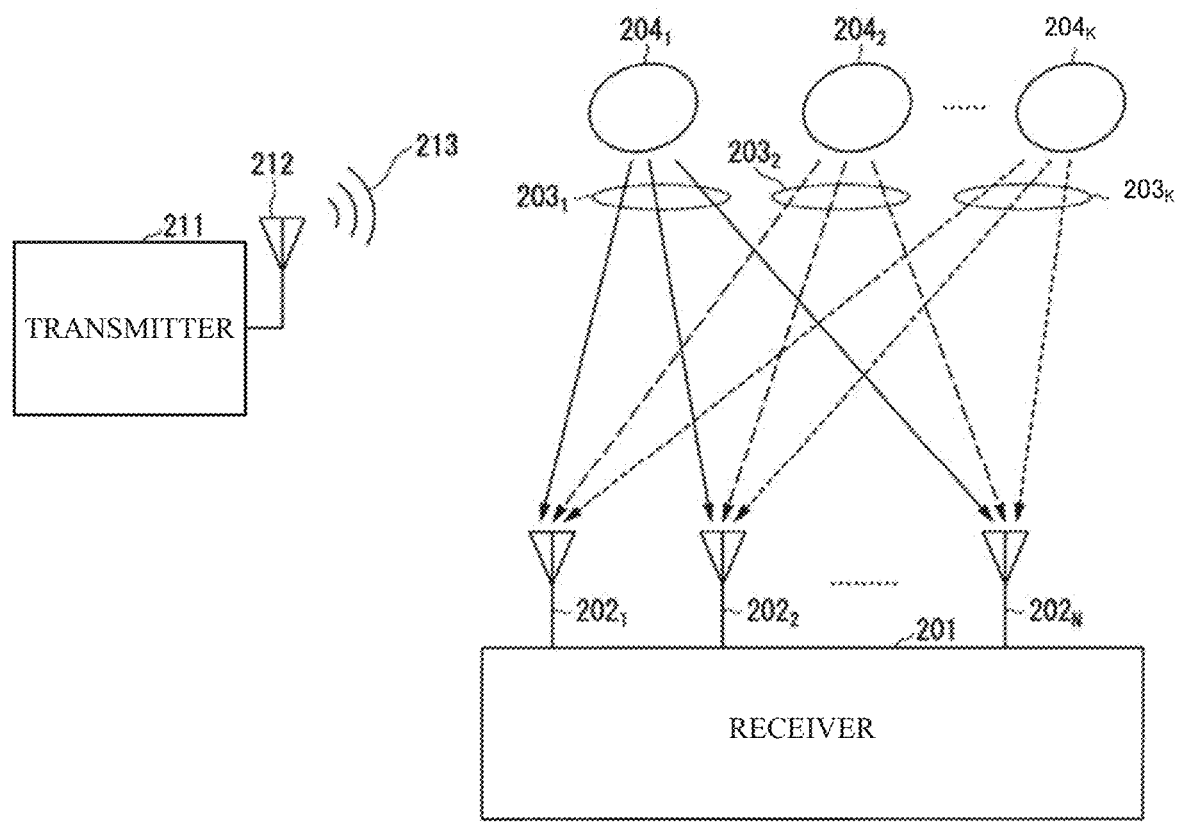
FIG. 21 is a diagram illustrating an object detection apparatus that employs the conventional array antenna method.
Figure 22:
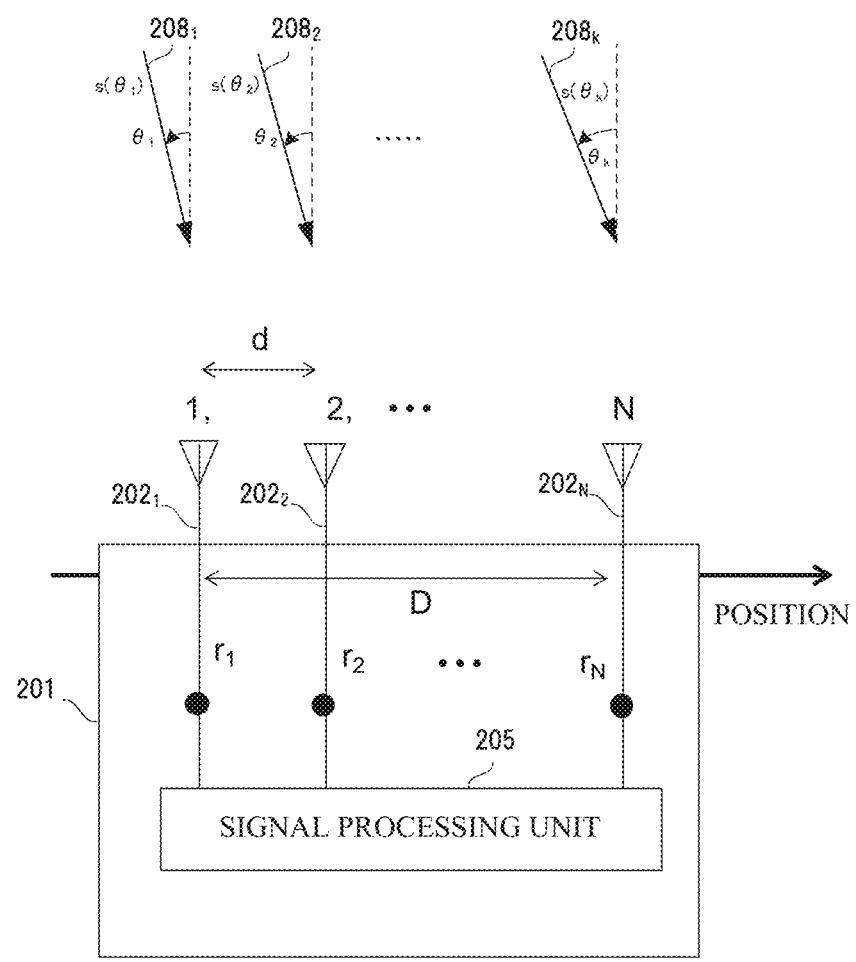
FIG. 22 is a diagram illustrating a configuration of a receiver that is shown in FIG. 21.
Figure 23:
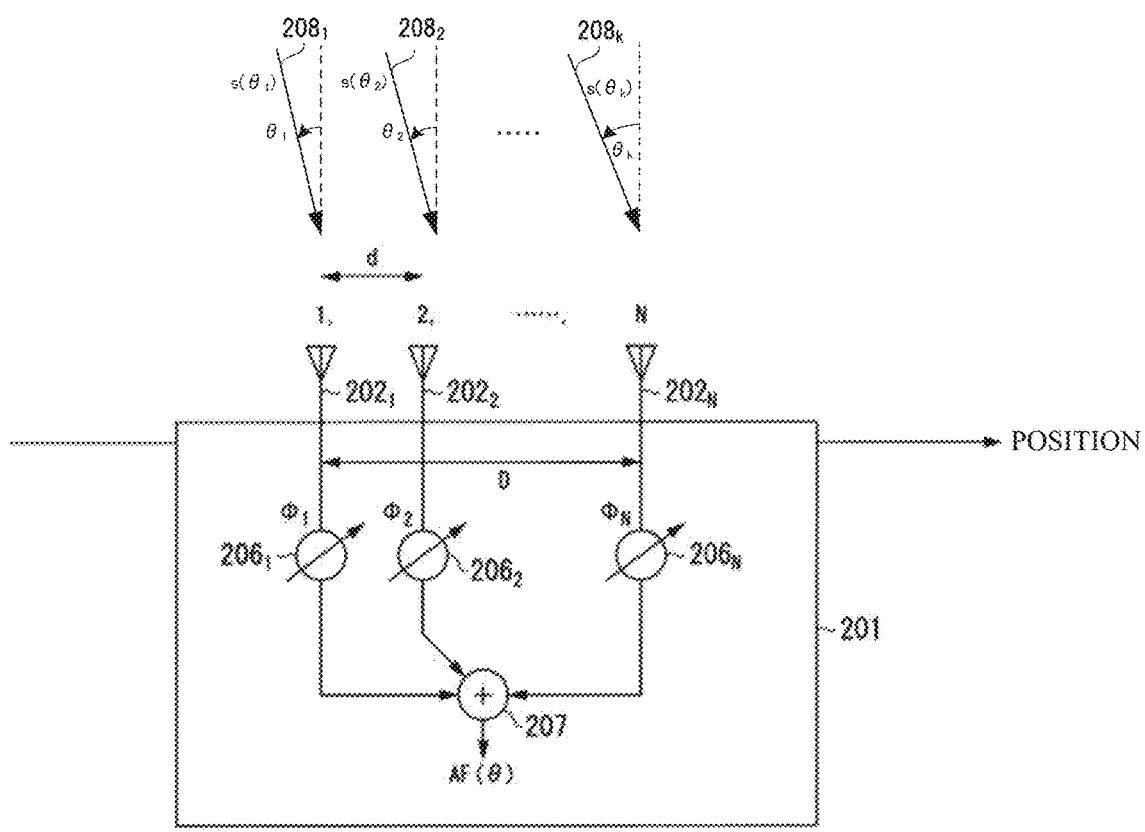
FIG. 23 is a diagram illustrating an example of a case where the beam former method is applied to the receiver shown in FIG. 21.
Figure 24:
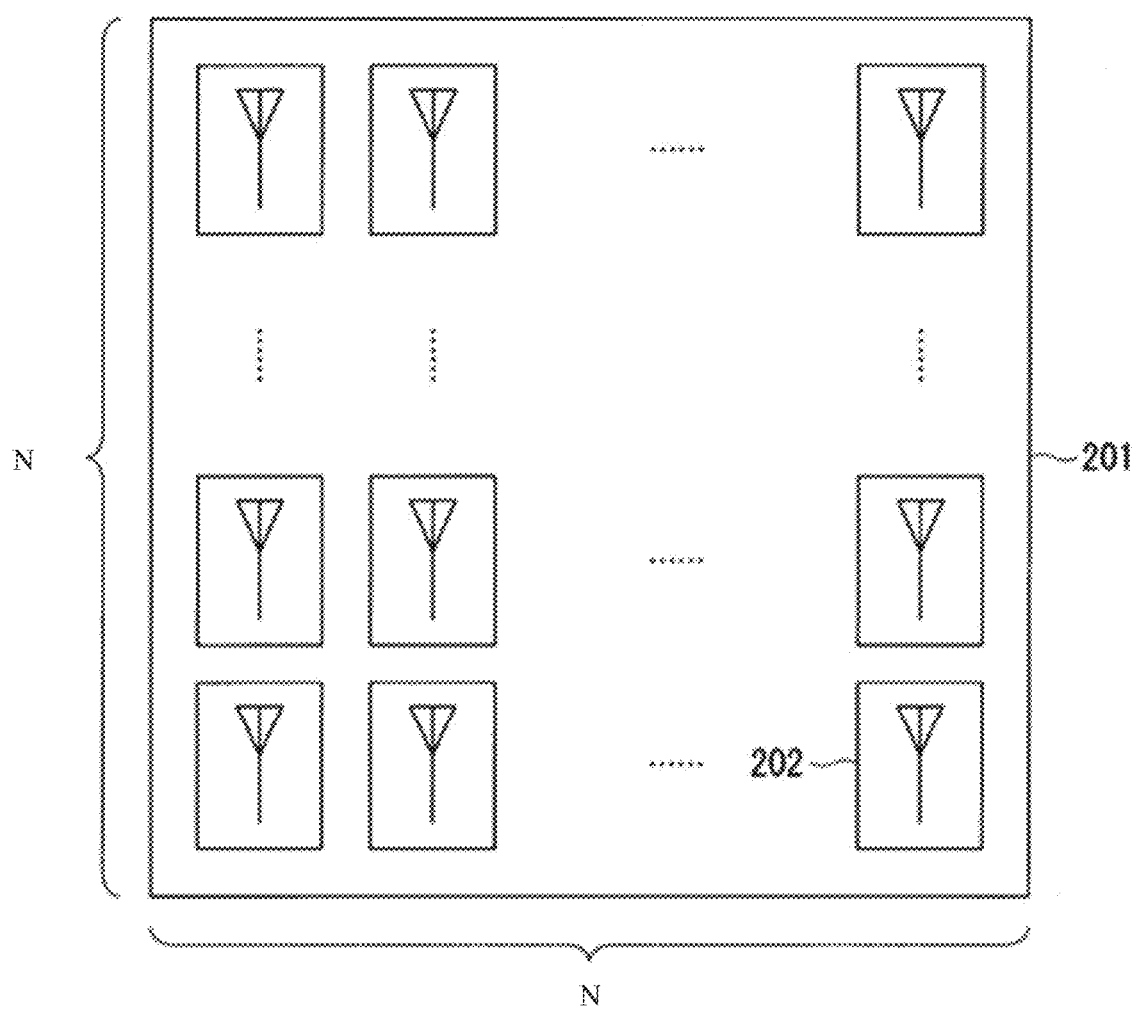
FIG. 24 is a diagram illustrating a schematic configuration of a receiving array antenna when the conventional array antenna method is employed.
Figure 25:
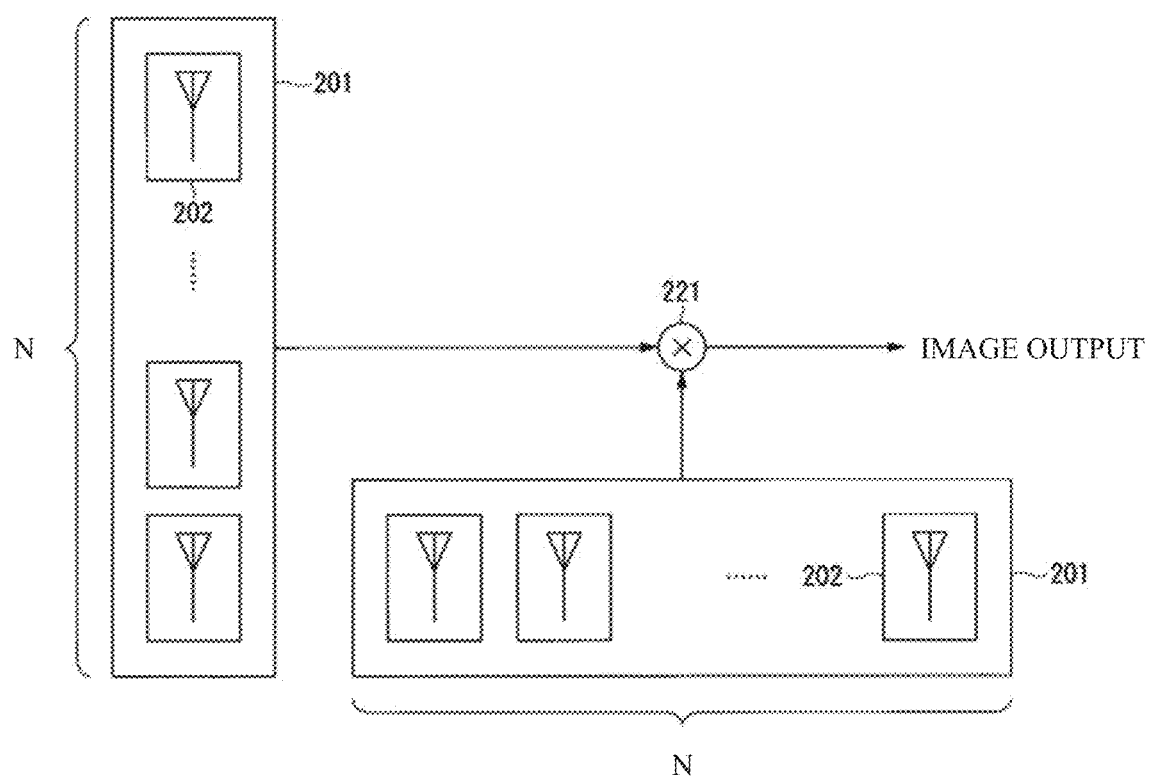
FIG. 25 is a diagram illustrating an object detection apparatus that employs the Mills cross method.
Figure 26:
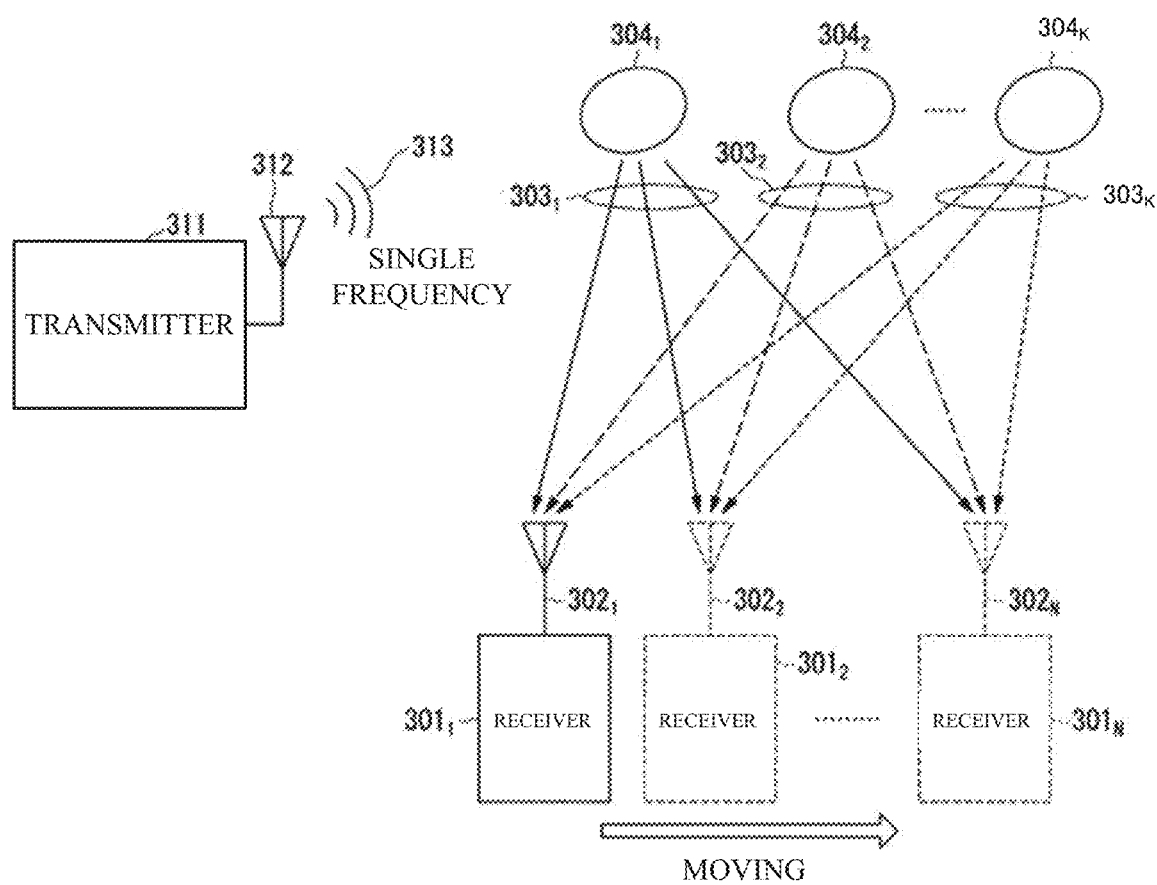
FIG. 26 is a diagram illustrating an object detection apparatus that employs the conventional synthetic aperture radar method.

The following will describe the computer (arithmetic device) that executes the program according to the example embodiment to realize the object detection apparatus 1000, with reference to FIG. 20. FIG. 20 is a block diagram illustrating an example of a computer that realizes the object detection apparatus according to the example embodiment of the invention.

As shown in FIG. 20, a computer 110 is provided with a Central Processing Unit (CPU) 111, a main memory 112, a storage device 113, an input interface 114, a display controller 115, a data reader/writer 116, and a communication interface 117. These components are connected to each other via a bus 121 so as to be able to communicate data with each other. Note that the computer 110 may also be provided with, in addition to or in place of the CPU 111, a Graphics Processing Unit (GPU) or a Field-Programmable Gate Array (FPGA).

The CPU 111 expands the programs (codes) according to the example embodiment stored in the storage device 113 onto the main memory 112, and executes them in a predetermined order, thereby executing various types of calculation. The main memory 112 is typically a volatile storage device such as a Dynamic Random Access Memory (DRAM). Furthermore, the program according to the example embodiment is provided in a state of being stored in the computer-readable recording medium 120. Note that the program according to the example embodiment may also be distributed on the Internet connected via the communication interface 117.

Furthermore, specific examples of the storage device 113 include, besides a hard disk drive, a semiconductor storage device such as a flash memory. The input interface 114 intermediates data transmission between the CPU 111 and an input device 118 such as a keyboard or a mouse. The display controller 115 is connected to a display device 119, and controls display on the display device 119.

The data reader/writer 116 intermediates data transmission between the CPU 111 and a recording medium 120, and executes reading of a program from the recording medium 120, and writing of a result of processing by the computer 110 to the recording medium 120. The communication interface 117 intermediates data transmission between the CPU 111 and another computer.

Furthermore, specific examples of the recording medium 120 include a general-purpose semiconductor storage device such as a Compact Flash (CF (registered trademark)) and a Secure Digital (SD), a magnetic recording medium such as a flexible disk, or an optical recording medium such as a Compact Disk Read Only Memory (CD-ROM).

Note that the object detection apparatus 1000 according to the example embodiment may also be realized by, instead of a computer in which a program is installed, hardware that corresponds to the constituent components. Furthermore, a configuration may also be employed in which part of the object detection apparatus 1000 is realized by a program, and the remaining part thereof is realized by hardware.

Part or whole of the above-described example embodiment can be expressed in the below-described Supplementary Notes 1 to 24, but the present invention is not limited to the below description.

[Supplementary Notes]

(Supplementary Note 1)

An object detection apparatus for detecting an object using radio waves, comprising:

a plurality of transmitting units configured to emit, to the object, radio waves that serve as transmission signals;

a receiving unit that is associated with any one of the plurality of transmitting units, and is configured to receive the radio waves reflected off the object as reception signals, and further mix the transmission signals with the received reception signals to generate intermediate frequency signals;

a spectrum calculation unit configured to calculate, based on the intermediate frequency signals, a spectrum that indicates a distribution of positions of the object;

a section determination unit configured to determine, based on peak positions of an amplitude of the calculated spectrum, sections for which a reflectance of the object is to be calculated;

a reflectance distribution calculation unit configured to calculate, for each pair of a transmitting unit and the receiving unit associated therewith, a reflectance of the object in each of the determined sections based on the intermediate frequency signals, and further calculate a product of the reflectance distributions over the sections, the reflectance distributions being calculated for the respective pairs; and an image generation unit configured to generate an image using the product of the reflectance distributions calculated for the respective pairs.

(Supplementary Note 2)

The object detection apparatus according to supplementary note 1, wherein the transmitting units transmit, as the transmission signals, radio waves whose frequency is modulated.

(Supplementary Note 3)

The object detection apparatus according to supplementary note 1 or 2, wherein the plurality of transmitting units emit the transmission signals at different timings.

(Supplementary Note 4)

The object detection apparatus according to supplementary note 1 or 2, wherein the plurality of transmitting units emit the transmission signals of different frequencies at the same timing.

(Supplementary Note 5)

The object detection apparatus according to any one of Supplementary Notes 1 to 4, wherein the transmitting units each include an oscillator configured to generate the transmission signals, and a transmitting antenna configured to emit the transmission signals, and the receiving unit includes a receiving antenna configured to receive the reception signals, a mixer configured to mix the transmission signals with the reception signals to generate the intermediate frequency signals, and an interface circuit configured to output the intermediate frequency signals.

(Supplementary Note 6)

The object detection apparatus according to any one of Supplementary Notes 1 to 5, wherein the spectrum calculation unit calculates a correlation matrix based on measured values of the intermediate frequency signals for each preset sampling time period, and calculates the spectrum based on the calculated correlation matrix.

(Supplementary Note 7)

The object detection apparatus according to supplementary note 6, wherein the spectrum calculation unit calculates, based on measured values of the intermediate frequency signals that have different ranges of the sampling time periods, a correlation matrix that corresponds to each of the ranges of the sampling time periods, further calculates an average of the correlation matrixes that correspond to the ranges of the sampling time periods, and then calculates the spectrum based on the average of the correlation matrixes.

(Supplementary Note 8)

The object detection apparatus according to supplementary note 6 or 7, wherein the reflectance distribution calculation unit calculates a direction matrix whose value is determined for each section, and calculates a reflectance of the object in each section using the calculated direction matrix and the calculated correlation matrix.

(Supplementary Note 9)

A object detection method for detecting an object using an apparatus that includes a plurality of transmitting units configured to emit, to the object, radio waves that serve as transmission signals, and a receiving unit that is associated with any one of the plurality of transmitting units, and is configured to receive the radio waves reflected off the object as reception signals, and further mix the transmission signals with the received reception signals to generate intermediate frequency signals, the method comprising:

(a) a step of calculating, based on the intermediate frequency signals, a spectrum that indicates a distribution of positions of the object;

(b) a step of determining, based on peak positions of an amplitude of the calculated spectrum, sections for which a reflectance of the object is to be calculated;

(c) a step of calculating, for each pair of a transmitting unit and the receiving unit associated therewith, a reflectance of the object in each of the determined sections based on the intermediate frequency signals, and further calculating a product of the reflectance distributions over the sections, the reflectance distributions being calculated for the respective pairs; and (d) a step of generating an image using the product of the reflectance distributions calculated for the respective pairs.

(Supplementary Note 10)

The object detection method according to supplementary note 9, wherein the transmitting units transmit, as the transmission signals, radio waves whose frequency is modulated.

(Supplementary Note 11)

The object detection method according to supplementary note 9 or 10, wherein the plurality of transmitting units emit the transmission signals at different timings.

(Supplementary Note 12)

The object detection method according to supplementary note 9 or 10, wherein the plurality of transmitting units emit the transmission signals of different frequencies at the same timing.

(Supplementary Note 13)

The object detection method according to any one of supplementary notes 9 to 12, wherein the transmitting units each include an oscillator configured to generate the transmission signals, and a transmitting antenna configured to emit the transmission signals, and the receiving unit includes a receiving antenna configured to receive the reception signals, a mixer configured to mix the transmission signals with the reception signals to generate the intermediate frequency signals, and an interface circuit configured to output the intermediate frequency signals.

(Supplementary Note 14)

The object detection method according to any one of supplementary notes 9 to 13, wherein, in the (a) step, a correlation matrix is calculated based on measured values of the intermediate frequency signals for each preset sampling time period, and the spectrum is calculated based on the calculated correlation matrix.

(Supplementary Note 15)

The object detection method according to supplementary note 14, wherein, in the (a) step, a correlation matrix that corresponds to each of the ranges of the sampling time periods is calculated based on measured values of the intermediate frequency signals that have different ranges of the sampling time periods, an average of the correlation matrixes that correspond to the ranges of the sampling time periods is further calculated, and the spectrum is calculated based on the average of the correlation matrixes.

(Supplementary Note 16)

The object detection method according to supplementary note 14 or 15, wherein, in the (c) step, the reflectance distribution calculation unit calculates a direction matrix whose value is determined for each section, and calculates a reflectance of the object in each section using the calculated direction matrix and the calculated correlation matrix.

(Supplementary Note 17)

A non-transitory computer readable recording medium for use in an object detection apparatus that includes a plurality of transmitting units configured to emit, to an object, radio waves that serve as transmission signals, a receiving unit that is associated with any one of the plurality of transmitting units, and is configured to receive the radio waves reflected off the object as reception signals, and further mix the transmission signals with the received reception signals to generate intermediate frequency signals, and a processor, the non-transitory computer readable recording medium including a program recorded thereon, the program including instructions that cause the processor to carry out:

(a) a step of calculating, based on the intermediate frequency signals, a spectrum that indicates a distribution of positions of the object;

(b) a step of determining, based on peak positions of an amplitude of the calculated spectrum, sections for which a reflectance of the object is to be calculated;

(c) a step of calculating, for each pair of a transmitting unit and the receiving unit associated therewith, a reflectance of the object in each of the determined sections based on the intermediate frequency signals, and further calculating a product of the reflectance distributions over the sections, the reflectance distributions being calculated for the respective pairs; and (d) a step of generating an image using the product of the reflectance distributions calculated for the respective pairs.

(Supplementary Note 18)

The computer-readable recording medium according to supplementary note 17, wherein the transmitting units transmit, as the transmission signals, radio waves whose frequency is modulated.

(Supplementary Note 19)

The computer-readable recording medium according to supplementary note 17 or 18, wherein the plurality of transmitting units emit the transmission signals at different timings.

(Supplementary Note 20)

The computer-readable recording medium according to supplementary note 17 or 18, wherein the plurality of transmitting units emit the transmission signals of different frequencies at the same timing.

(Supplementary Note 21)

The computer-readable recording medium according to any one of supplementary notes 17 to 20, wherein the transmitting units each include an oscillator configured to generate the transmission signals, and a transmitting antenna configured to emit the transmission signals, and the receiving unit includes a receiving antenna configured to receive the reception signals, a mixer configured to mix the transmission signals with the reception signals to generate the intermediate frequency signals, and an interface circuit configured to output the intermediate frequency signals.

(Supplementary Note 22)

The computer-readable recording medium according to any one of supplementary notes 17 to 21, wherein, in the (a) step, a correlation matrix is calculated based on measured values of the intermediate frequency signals for each preset sampling time period, and the spectrum is calculated based on the calculated correlation matrix.

(Supplementary Note 23)

The computer-readable recording medium according to supplementary note 22, wherein, in the (a) step, a correlation matrix that corresponds to each of the ranges of the sampling time periods is calculated based on measured values of the intermediate frequency signals that have different ranges of the sampling time periods, an average of the correlation matrixes that correspond to the ranges of the sampling time periods is further calculated, and the spectrum is calculated based on the average of the correlation matrixes.

(Supplementary Note 24)

The computer-readable recording medium according to supplementary note 22 or 23, wherein, in the (c) step, the reflectance distribution calculation unit calculates a direction matrix whose value is determined for each section, and calculates a reflectance of the object in each section using the calculated direction matrix and the calculated correlation matrix.

Although the present invention has been described with reference to embodiments above, the invention is not limited to the above example embodiments. Furthermore, the content disclosed in the above-described Patent Documents and the like may also be incorporated in the invention of the present application by reference. In the frame of the entire disclosure of the invention of the present application (including the claims), and further on the basis of its basic technical concept, modification and adjustment of the example embodiments are possible. Furthermore, in the frame of the claims of the invention of the present application, various combinations or selection of various disclosed elements is also possible. In other words, the invention according to the present application, of course, encompasses various modifications and corrections understandable to a person skilled in the art, according to the entire disclosure including the claims and the technical idea.

This application is based upon and claims the benefit of priority from Japanese Patent Application No. 2017-23410, filed Feb. 10, 2017, the disclosure of which is incorporated herein in its entirety by reference.

INDUSTRIAL APPLICABILITY

As described above, the invention can improve the accuracy of detecting an object using radio waves, while suppressing increases in the device cost, size, and weight. The invention is useful when used to image items behind clothes, items in bags, or the like, and inspect them.

LIST OF REFERENCE SIGNS

110 Computer
111 CPU
112 Main memory
113 Storage device
114 Input interface
115 Display controller
116 Data reader/writer
117 Communication interface
118 Input device
119 Display device
120 Recording medium
121 Bus
1000 Object detection apparatus
1001 Transmitting/receiving device
1002 Transmitting/receiving device arrangement plane
1003 Target object (object serving as detection target)
1004 Target object arrangement plane
1101 Transmitting unit
1102 Receiving unit
1103 Spectrum calculation unit
1104 Section determination unit
1105 Reflectance distribution calculation unit
1106 Image generation unit
1201 Oscillator
1202 Transmitting antenna
1203 Receiving antenna
1204 Mixer
1205 Interface circuit
1206, 1207 Variable phase shifter
1208 Terminal
1211 Arithmetic device
1221 Sub array
1231 RF frequency

The invention claimed is:

1. An object detection apparatus for detecting an object using radio waves, comprising:
   a plurality of transmitters configured to emit, to the object, the radio waves that serve as transmission signals;
   a plurality of receivers respectively corresponding to the transmitters, each receiver configured to receive the radio waves reflected off the object as reception signals, and mix the transmission signals with the received reception signals to generate intermediate frequency signals;
   a processor; and
   a memory storing a program that cause the processor to:
      calculate, based on measured values of the intermediate frequency signals that have different ranges of sampling time periods, a correlation matrix corresponding to each of the different ranges, yielding a plurality of correlation matrices respectively corresponding to the different ranges;
      calculate an average of the correlation matrices respectively corresponding to the different ranges;
      calculate a spectrum based on each correlation matrix, yielding a plurality of spectrums respectively corresponding to the correlation matrices, each spectrum indicating a distribution of positions of the object;
      calculate a spectrum average of the spectrums respectively corresponding to the correlation matrices;
      determine, based on peak positions of an amplitude of each spectrum, sections for which a reflectance of the object is to be calculated;
      calculate, for each transmitter and the receiver corresponding thereto, a direction matrix having a value determined for each of the sections, and the reflectance of the object in each of the sections based on the intermediate frequency signals and using the direction matrix and the correlation matrices respectively corresponding to the different ranges, yielding a plurality of reflectances;
      calculate, for each transmitter and the receiver corresponding thereto, a product of a distribution of the reflectance over the sections; and
      generate an image using the product of the reflectance distributions calculated for each transmitter and the receiver corresponding thereto.

2. The object detection apparatus according to claim 1, wherein the transmitters transmit, as the transmission signals, the radio waves having a frequency that is modulated.

3. The object detection apparatus according to claim 1, wherein the transmitters emit the transmission signals at different timings.

4. The object detection apparatus according to claim 1, wherein the transmitters emit the transmission signals of different frequencies at a same timing.

5. The object detection apparatus according to claim 1, wherein the transmitters each include an oscillator configured to generate the transmission signals, and a transmitting antenna configured to emit the transmission signals, and
the receivers each include a receiving antenna configured to receive the reception signals, a mixer configured to mix the transmission signals with the reception signals to generate the intermediate frequency signals, and an interface circuit configured to output the intermediate frequency signals.

6. An object detection method for detecting an object using an apparatus that includes a plurality of transmitters configured to emit, to the object, radio waves that serve as transmission signals, and a plurality of receivers respectively corresponding to the transmitters, each receiver configured to receive the radio waves reflected off the object as reception signals, and mix the transmission signals with the received reception signals to generate intermediate frequency signals, the method comprising:

calculating, based on measured values of the intermediate frequency signals that have different ranges of sampling time periods, a correlation matrix corresponding to each of the different ranges, yielding a plurality of correlation matrices respectively corresponding to the different ranges;

calculating an average of the correlation matrices respectively corresponding to the different ranges;

calculating a spectrum based on each correlation matrix, yielding a plurality of spectrums respectively corresponding to the correlation matrices, each spectrum indicating a distribution of positions of the object;

calculating a spectrum average of the spectrums respectively corresponding to the correlation matrices;

determining, based on peak positions of an amplitude of each spectrum, sections for which a reflectance of the object is to be calculated;

calculating, for each transmitter and the receiver corresponding thereto, a direction matrix having a value determined for each of the sections, and the reflectance of the object in each of the sections based on the intermediate frequency signals and using the direction matrix and the correlation matrices respectively corresponding to the different ranges, yielding a plurality of reflectances;

calculating, for each transmitter and the receiver corresponding thereto, a product of a distribution of the reflectance over the sections; and generating an image using the product of the reflectance distributions calculated for each transmitter and the receiver corresponding thereto.

7. A non-transitory computer readable recording medium for use in an object detection apparatus that includes a processor, a plurality of transmitters configured to emit, to the object, radio waves that serve as transmission signals, and a plurality of receivers respectively corresponding to the transmitters, each receiver configured to receive the radio waves reflected off the object as reception signals, and mix the transmission signals with the received reception signals to generate intermediate frequency signals, the non-transitory computer readable recording medium including a program recorded thereon, the program including instructions that cause the processor to:

calculate, based on measured values of the intermediate frequency signals that have different ranges of sampling time periods, a correlation matrix corresponding to each of the different ranges, yielding a plurality of correlation matrices respectively corresponding to the different ranges;

calculate an average of the correlation matrices respectively corresponding to the different ranges;

calculate a spectrum based on each correlation matrix, yielding a plurality of spectrums respectively corresponding to the correlation matrices, each spectrum indicating a distribution of positions of the object;

calculate a spectrum average of the spectrums respectively corresponding to the correlation matrices;

determine, based on peak positions of an amplitude of each spectrum, sections for which a reflectance of the object is to be calculated;

calculate, for each transmitter and the receiver corresponding thereto, a direction matrix having a value determined for each of the sections, and the reflectance of the object in each of the sections based on the intermediate frequency signals and using the direction matrix and the correlation matrices respectively corresponding to the different ranges, yielding a plurality of reflectances;

calculate, for each transmitter and the receiver corresponding thereto, a product of a distribution of the reflectance over the sections; and generate an image using the product of the reflectance distributions calculated for each transmitter and the receiver corresponding thereto.

8. The object detection method according to claim 6, wherein the transmitters transmit, as the transmission signals, the radio waves having a frequency that is modulated.

9. The object detection method according to claim 6, wherein the transmitters emit the transmission signals at different timings.

10. The object detection method according to claim 6, wherein the transmitters emit the transmission signals of different frequencies at a same timing.

11. The object detection method according to claim 6, wherein the transmitters each include an oscillator configured to generate the transmission signals, and a transmitting antenna configured to emit the transmission signals, and the receivers each include a receiving antenna configured to receive the reception signals, a mixer configured to mix the transmission signals with the reception signals to generate the intermediate frequency signals, and an interface circuit configured to output the intermediate frequency signals.

\* \* \* \* \*